United States Patent [19]
Khelghatti et al.

[11] Patent Number: 5,844,906
[45] Date of Patent: Dec. 1, 1998

[54] AUTOMATIC SYNCHRONIZATION OF CONTINUOUS BIT RATE ATM CELLS IN A POINT-TO-MULTIPOINT BROADBAND ACCESS NETWORK

[75] Inventors: Hojat Khelghatti; Zaheer Ahmed, both of San Jose; Gustavo Lau, Fremont, all of Calif.

[73] Assignee: Ericsson, Inc., Menlo Park, Calif.

[21] Appl. No.: 884,909

[22] Filed: Jun. 30, 1997

[51] Int. Cl.[6] ...................................................... H04J 3/24
[52] U.S. Cl. ........................... 370/474; 370/503; 370/443
[58] Field of Search .................................... 370/437, 439, 370/442, 443, 395, 473, 474, 449, 503, 498; 375/36

[56] References Cited

U.S. PATENT DOCUMENTS

| 5,452,330 | 9/1995 | Goldstein | 375/257 |
|---|---|---|---|
| 5,570,355 | 10/1996 | Dail | 370/60.1 |
| 5,734,653 | 3/1998 | Hiraiwa | 370/395 |

FOREIGN PATENT DOCUMENTS

| 9540290 | 5/1906 | Australia . |
|---|---|---|
| 0 757 503 A2 | 2/1997 | European Pat. Off. . |
| 8-163150 | 6/1996 | Japan . |
| 8-186584 | 7/1996 | Japan . |
| 8-274774 | 10/1996 | Japan . |
| 2 291 562 A | 1/1996 | United Kingdom . |
| 2 299 240 A | 9/1996 | United Kingdom . |
| WO 95/32596 | 11/1995 | WIPO . |
| WO96/23378 | 8/1996 | WIPO . |
| WO 96/31080 | 10/1996 | WIPO . |

*Primary Examiner*—Chau NGUYEN
*Assistant Examiner*—Thinh Vu
*Attorney, Agent, or Firm*—Lyon & Lyon LLP

[57] ABSTRACT

In a point-to-multipoint network having a headend in communication with a plurality a network terminals over a shared network, a network terminal is equipped with a cell permit sequencer, which operates in conjunction with a AAL1 segmentation and reassembly processor, whereby the packing of ATM cells carrying continuous bit rate telephony traffic is initially delayed such that the first cell of a new communication sequence will be "just ready" for upstream transmission to the headend with the arrival of an ensuing scheduled transmission permit from the headend, including accounting for internal processing and transmission overhead. In this manner, the ensuing ATM cells for the respective communication sequence will thereby be synchronized with the ensuing permits, and delay time at the NT thus minimized.

6 Claims, 17 Drawing Sheets

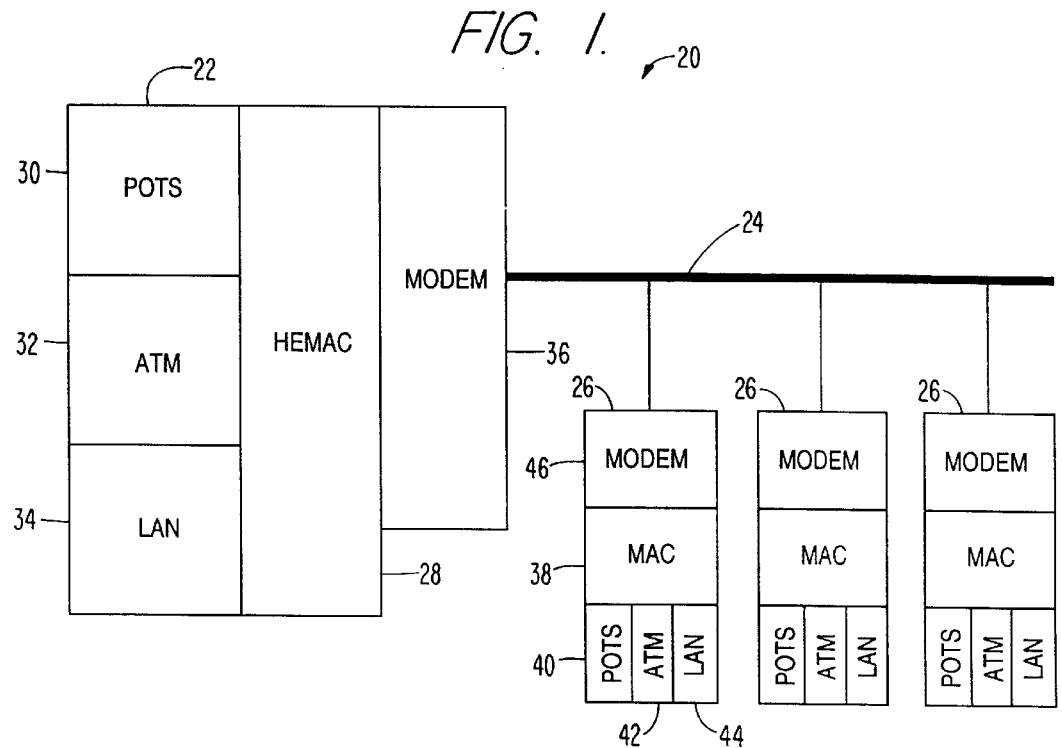
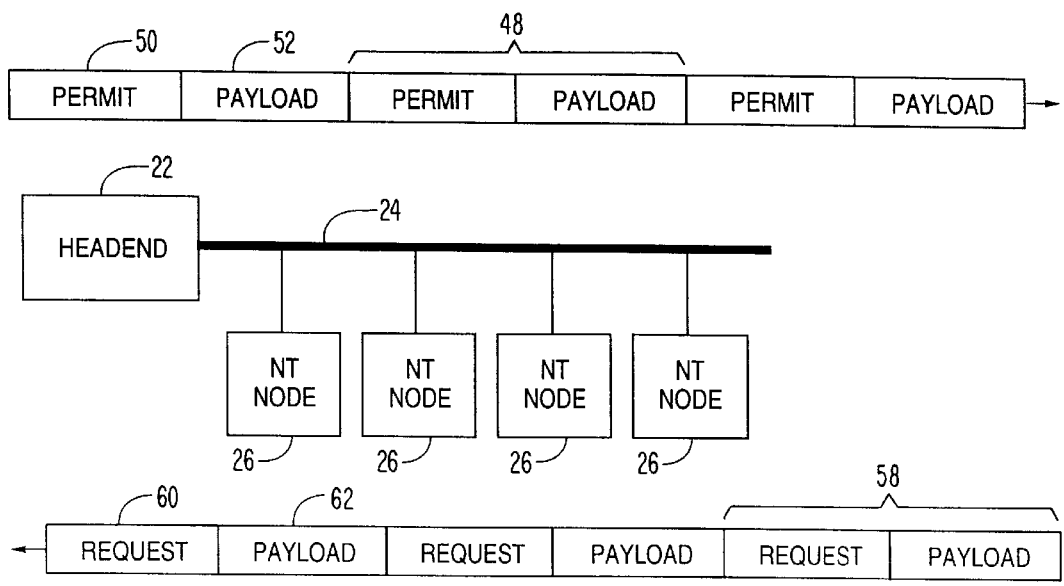

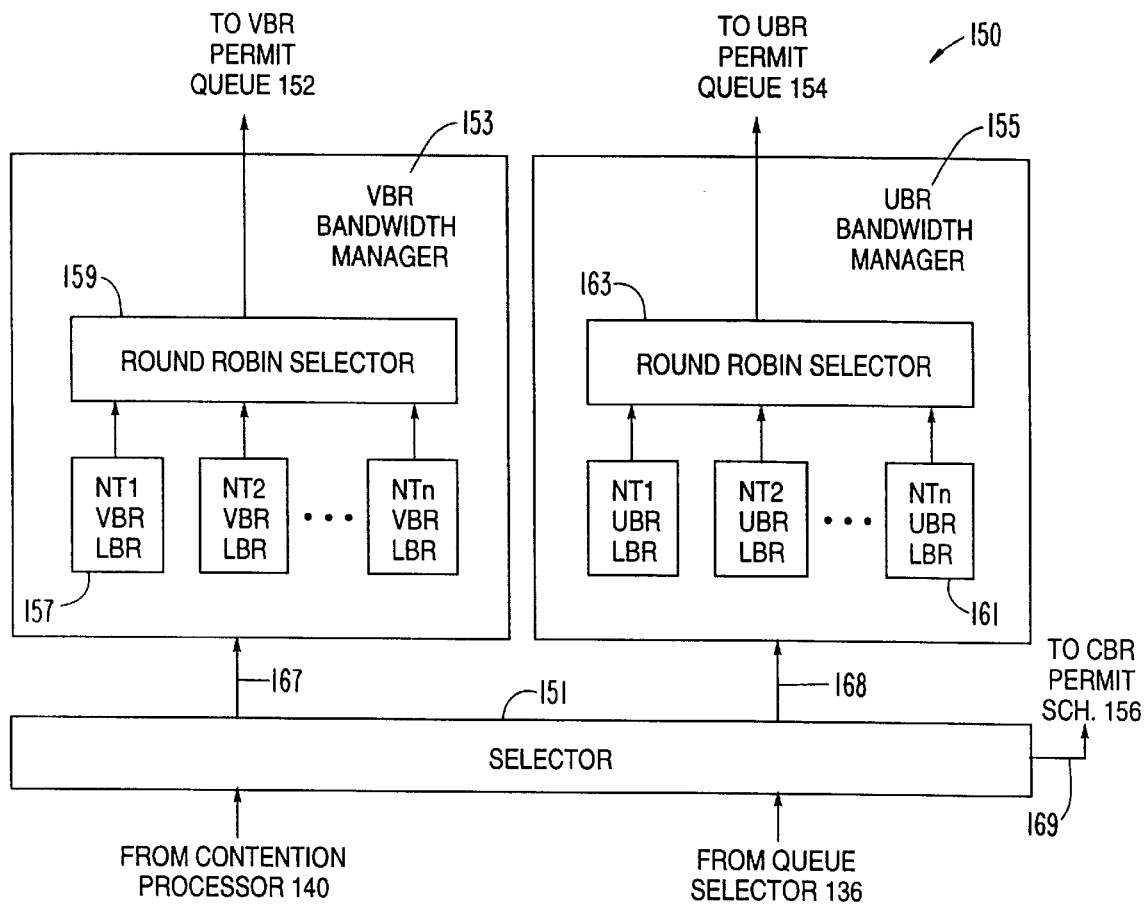

5,844,906

AUTOMATIC SYNCHRONIZATION OF CONTINUOUS BIT RATE ATM CELLS IN A POINT-TO-MULTIPOINT BROADBAND ACCESS NETWORK

FIELD OF THE INVENTION

The present invention pertains to the field of communication networks, including apparatus and data transmission protocols for the transport of digital data over a shared point-to-multipoint broadband access network.

BACKGROUND OF THE INVENTION

Much activity is presently being directed into the design and deployment of "point-to-multipoint" broadband access networks, wherein downstream signals are broadcast from a single head-end facility to multiple end user stations (i.e., via "point-to-multipoint" transmission), and upstream signals are transmitted from each respective end users to the head end facility (i.e., via "point-to-point" transmission), respectively. It presently anticipated that point-to-multipoint broadband access networks will be employed to support a variety of independent communication services, such as, e.g., traditional two-way telecommunications, broadcast video (i.e., CATV) services and a full range of digital baseband services.

Given the wide variety of potential communication services to be supported over point-to-multipoint network broadband access networks, it is desirable to provide efficient digital data transmission protocols for supporting both the downstream and upstream communication paths. Notably, such networks are well suited to support asynchronous transfer mode ("ATM") based data transmission, whereby data packets or "cells" are periodically assembled and transmitted from a sending node, and received and disassembled at a receiving node. ATM transmission enables the transmission of multiple services over a single communication path, whereby individual service bandwidth utilization may be optimized as a function of the statistical activity of each individual service—i.e., wherein the services are "bursty" in nature, so that bandwidth is efficiently shared.

For example, bursty data traffic may include local area network ("LAN") traffic, which is traditionally limited to private, or closed-loop networks, but may be more frequently carried over shared public access (e.g., telecommunication) networks for greater efficiency in connecting multiple LAN locations. Further, with the explosion of recent interest in services associated with the "Internet", demand for low cost, high speed two-way digital data transport is at an all time high.

By way of specific example, network architectures and data communication protocols for supporting both downstream and upstream transport of ATM-based digital data over a point-to-multipoint network comprising a headend facility connected to multiple downstream network terminals ("NTs") via a shared coaxial distribution network are disclosed and described in U.S. patent application Ser. No. 08/772,088, filed Dec. 19, 1996, entitled "Network Architecture for Broadband Data Communication Over a Shared Medium" (hereinafter referred to as "the '088 application"), which is assigned to the assignee of the present invention and which is fully incorporated herein by reference.

As set forth in the '088 application, the headend facility is provided with a central HeadEnd Media Access Control unit ("HEMAC"), which communicates with respective Media Access Control ("MAC") units located in each NT. Digital data is presented to the HEMAC and respective NT MAC units via dedicated service interfaces, such as, e.g., CBR telephony, ATM, or LAN data interfaces at each location.

Between the HEMAC and the respective NT MAC units, "downstream" data (i.e., from the headend to the NTs) is transmitted in continuous serial data frames over a common RF carrier frequency, wherein all downstream data frames are received by all NTs associated with the respective downstream RF carrier channel. The NTs evaluate each downstream data frame, e.g., based on destination or broadcast address fields, to determine whether it is an intended recipient of data contained therein. "Upstream" data (i.e., from an NT to the headend) is packetized in ATM cells and transported in respective data frames from individual NTs in TDMA slots over a shared upstream RF carrier channel that is separate from the downstream carrier channel.

As disclosed and described in the '088 application, selected downstream transmission rates are in multiples of 8 Khz (i.e. 125 usec) to accommodate basic rate (i.e., CBR) telephony traffic. For example, as disclosed in the '088 application, downstream data frames are formed by two or more repeating pairs of frame slots, wherein each downstream frame is transmitted over a 250 usec interval, regardless of the number of slot pairs it contains. Notably, all downstream frame rates are supported by a single upstream data rate. Upstream frame transmission timing is identical to the downstream frame transmission timing—, i.e., each upstream frame is also transmitted over a 250 usec interval, regardless of its payload size. An individually calculated upstream transmission delay is imposed at each NT so that the upstream frames are received serially at the headend facility at the same interval timing as the downstream frames are being transmitted.

In operation, the HEMAC allocates upstream bandwidth to respective NTs based on a selected set of operating criteria and service type priorities. In addition to a data "payload", each downstream data frame includes an upstream bandwidth "permit" that, depending on the type of permit issued in a given downstream frame, allows for one or more respective NTs to transmit an upstream bandwidth "request" in a corresponding upstream data frame. Generally, permits are issued by the HEMAC on both a "polling" basis, i.e., wherein a permit is targeted to a specific NT, as well as a "contention" basis, i.e., wherein one or more NTs may vie for an available upstream request slot. Permits are also issued based on specific types of upstream data to be transmitted, whereby priority may be given to certain services requiring low cell delay variation ("CDV"), such as CBR telephony traffic. Permit types also include "sign-on" permits for allowing newly activated NTs to make their presence known to the HEMAC, and "ranging" permits for allowing the HEMAC to W determine, and adjust for, respectively, the requisite transmission delay for a respective NT.

Because upstream frame transmission is provided in TDMA frames corresponding on a one-to-one basis with downstream TDMA frames, only one permit is provided in each respective downstream frame per upstream carrier channel. Upstream network capacity may be expanded by providing one or more additional upstream RF carrier channels. In this manner, respective groups of NTs simultaneously transmit upstream on separate carrier channels in response to separate permits issued by the HEMAC in the same downstream frame.

In accordance with industry ATM telephony standards, an ATM cell carries forty-seven bytes of CBR telephony data sampled at a rate of one byte every 125 usec (i.e., sampled at the basic telephony rate of 8 KHz). Thus the CBR ATM cells are assembled every 125 usec * 47=5.875 msec. To meet this standard ATM transmission timing interval, while maintaining a 250 usec frame interval, the '088 application teaches the use of a CBR permit scheduler table employed by the headend controller, which allocates CBR permits alternately at 6.00 msec and 5.75 msec intervals, for an overall average of 5.875 msec.

However, this CBR permit scheduler fails to account for further transmission delays inherent in the overall network architecture, including in particular the transmission overhead time in the NT hardware components between when a CBR cell is fully constructed at the NT and when it is actually transmitted upstream over the network. For example, the inventors of the present application have discovered that in a presently preferred embodiment of an NT designed for use on a point-to-multipoint system architecture, such as that disclosed in the '088 application, this additional internal circuit component overhead time can typically amount to between 0.18 msec and 0.20 msec.

As a result of this overhead, an ATM cell assembled after 5.875 sec will not be ready for transmission at the arrival of the permit at either 5.75 or 6.0 msec, and will have to wait for the next permit cycle, causing an undesirable amount of delay in the network. In particular, this time delay will manifest itself in the form of an system "echo."

SUMMARY OF THE INVENTION

The present invention provides systems and apparatus for use in a point-to-multipoint broadband access network architecture, such as that disclosed and described in the '088 application. In particular, the systems and apparatus of the present invention account and compensate for internal circuit component transmission overhead in a network terminal ("NT"), such that the time between when an CBR ATM cell is fully constructed and when it is transmitted to the headend is minimized.

To this end, and in accordance with a general aspect of the present invention, a network terminal is equipped with a cell permit sequencer, which operates in conjunction with a AAL1 segmentation and reassembly ("SAR") processor, wherein the packing of a first CDR ATM cell in a given CBR transmission sequence is initially delayed such that the cell will be "just ready" for upstream transmission to the headend with the arrival of an ensuing scheduled permit, including accounting for internal processing and transmission overhead.

More particularly, in a preferred embodiment, a respective NT sends an upstream request upon detection of an off-hook condition on an associated subscriber telephony line to initiate the issuance of regularly scheduled CDR permits allowing for upstream transmission of the anticipated CDR telephony traffic. A permit timing slot is assigned by a CBR permit scheduler at the headend and confirmed with the respective NT in an ensuing downstream data frame. Upon detecting the off-hook condition, the NT also notifies its respective cell permit sequencer to anticipate receipt of a first CBR permit from the headend.

Upon receipt of the first permit, the cell permit sequencer triggers an internal timer, which is set for an interval equal to the anticipated arrival time of a "permit-after-next" (i.e., 11.75 msec), minus both the time required to collect the data bytes for the first cell (i.e., 5.875 msec) and a predetermined internal NT transmission and processing overhead time (i.e., 0.18–0.20 msec). The expiration of the timer arms the AAL1

SAR processor, which immediately begins assembly of a first CBR ATM cell. In this manner, the first cell will be packed and in position for upstream transmission, just as the third permit in the scheduled sequence arrives at the NT. The ATM cells will thereby be synchronized with the MAC layer permits, and delay time at the NT thus minimized.

Other and further objects, features, aspects and advantages of the present invention will become better understood with the following detailed description of the accompanying drawings.

BRIEF DESCRIPTION OF THE DRAWINGS

NOTE: FIGS. 1 to 18, along with the accompanying text, are taken from '088 application, and are set forth herein to provide a more full and complete understanding of the present invention, which is disclosed and described in conjunction with a preferred embodiment illustrated in FIG. 19. More particularly:

FIG. 1 is a block diagram of an exemplary broadband communication network employing a coaxial distribution network for transmitting data between a headend facility and multiple network terminals;

FIG. 2 is a block diagram depicting the respective downstream and upstream transmission of digital data frames in the communication network of FIG. 1;

FIG. 3 is a block diagram of preferred downstream data frame formats employing alternate DVB framing slot configurations;

FIG. 4 is a block diagram of a preferred DVB framing slot pair for use in the preferred downstream data frame formats of FIG. 3;

FIG. 5 is a block diagram of a preferred MAC control byte allocation in a four DVB framing slot downstream data frame;

FIG. 6 is a block diagram of a preferred MAC control byte allocation in a six DVB framing slot downstream data frame;

FIG. 7 is a block diagram of a preferred MAC control byte allocation in an eight DVB framing slot downstream data frame;

FIG. 8 is a block diagram of preferred MAC control byte allocation in a six byte ATM expansion channel;

FIG. 9 is a block diagram of a preferred upstream data frame transmitted in response to a contention sign-on permit;

FIG. 10 is a block diagram of a preferred upstream data frame transmitted in response to a ranging permit;

FIG. 11 is a timing diagram illustrating a preferred network terminal transmission delay protocol;

FIG. 12 is a block diagram of a preferred upstream data frame transmitted in response to an reservation mode permit;

FIG. 13 is a block diagram of a preferred upstream data frame transmitted in response to a contention mode permit;

FIG. 14 is a block diagram of a preferred upstream data frame transmitted in response to a block request polling permit;

FIG. 15 is a block diagram of a preferred upstream data frame transmitted in response to a group contention permit;

FIG. 16 is a functional block diagram of the respective headend and network terminal MAC controllers, illustrating the process for controlling the transmission and receipt of the respective downstream permits and upstream request slots;

FIG. 17 is a functional block diagram of the permit selector and spacing processor of the headend controller of FIG. 16;

FIG. 18 is a CBR permit scheduler table employed by the headend controller of FIG. 16.

DETAILED DESCRIPTION OF THE DRAWINGS

Figure 3:
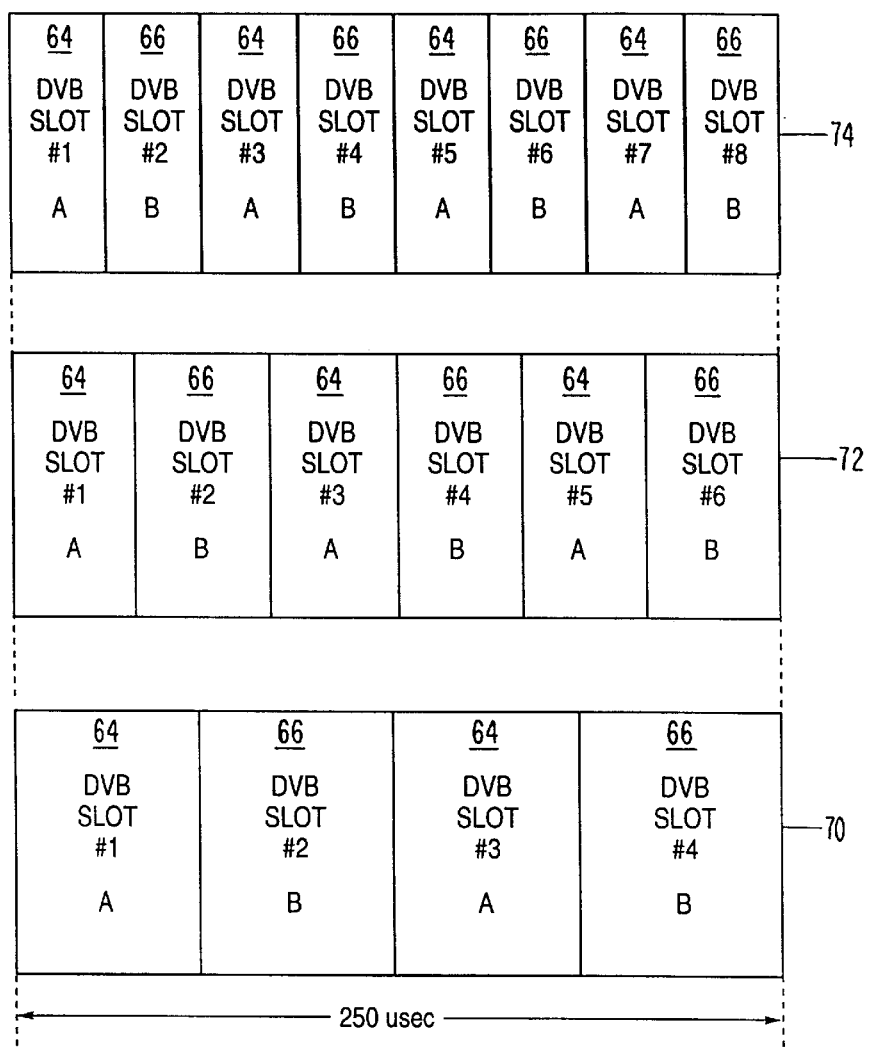

Referring to FIG. 1, a broadband communication network 20 includes a headend facility 22, which transmits and receives digital data over a coaxial distribution network 24 to and from, respectively, multiple network terminal nodes (NTs) 26. The headend facility 22 includes a HeadEnd Media Access Controller (HEMAC) 28, which controls the transport of various digital data streams between the headend facility 22 and the respective NTs 26. For purposes of illustration, the headend 22 is shown equipped with a synchronous telephony (POTS) interface 30, an ATM packet interface 32 and a LAN data interface 34, each of which individually transmit and receive digital data to and from, respectively, the headend 22.

The headend 22 is also equipped with a modem 36 for RF carrier modulating downstream data signals over the coaxial distribution network 24 on a selected RF carrier channel to all NTs 26 associated with that channel. The modem 36 also demodulates RF carrier modulated upstream data received from respective NTs 26 on one or more upstream RF carrier channels that are separate from the respective downstream data channel. In preferred embodiments, the coaxial distribution network 24 is limited to network "trees" having no more than three amplifiers (not shown) along any one route, i.e., from the headend facility 22 to a given NT 26, in order to limit the impact of transient noise and distortion on the respective downstream and upstream communication signals.

Each NT 26 is equipped with its own Media Access Controller (NT MAC) 38 for handling various digital data streams transmitted between the respective NT 26 and the headend facility 22. Each NT 26 preferably supports one or more of the digital data services handled by the headend facility 22. For example, in the illustrated preferred embodiment, each NT 26 is equipped with a CBR telephony (POTS) interface 40, an ATM interface 42 and a LAN data interface 44, respectively, each which individually transmit and receive digital data to and from the respective NT 36. As will be apparent to those skilled in the art, there is no requirement that any given NT 26 be equipped to handle all of the particular data services supported by the headend 22. Each NT 26 is equipped with its own modem 46, which demodulates downstream data signals received from the headend 22 for processing by the NT's MAC 38. The NT modem 46 also modulates respective upstream data signals for transmission to the headend 22 over the coaxial distribution network 24 on a different respective RF carrier channel.

Referring to FIG. 2, downstream data is transmitted from the headend 22 in continuous (serial) downstream data frames 48, which generally include an upstream bandwidth "permit" 50 and payload data 52. In order to dynamically assign upstream transmission bandwidth, the HEMAC 28 issues the upstream bandwidth permits 50 on a "one permit per downstream frame" basis for each utilized upstream carrier channel. As described in greater detail below in conjunction with FIGS. 5–8, the permits 50 are carried in a MAC overhead section of each downstream data frame 48. In accordan with a general aspect of the '088 application, upstream bandwidth permits are allocated by the HEMAC 28 on either a reserved or "polling" basis, or on a "contention" basis. As described in greater detail below in conjunction with FIGS. 16–18, a "scheduled" basis is also employed by the HEMAC 28 for upstream bandwidth permit allocation for certain low CDV services, such as CBR telephony traffic.

As will be apparent to those skilled in the art, an advantage of "reservation mode" permits is that they are "collisionless" and may thus be used by the HEMAC 28 to reserve a portion of the available upstream bandwidth for a given carrier channel exclusively for one or more specifically targeted NTs 26 on a predetermined basis. Reservation mode permits are thus advantageous in heavy network traffic conditions in that they insure that all NTs 26 have at least some opportunity to transmit upstream data. On the other hand, "contention mode" permits allow one or more NTs 26 needing to request upstream bandwidth to "contend" for an available upstream transmission slot. Thus, contention mode permits are especially advantageous in networks containing a relatively large number of NTs 26, wherein a "polling only" protocol would take too long in finding particular NTs 26 needing to request upstream bandwidth, and would waste bandwidth in the process by necessarily polling uninterested NTs 26. However, because contention mode permits result in collisions between responding NTs 26, they are far more effective in light network traffic conditions than in heavy network traffic conditions.

In accordance with a further general aspect of the '088 application, both contention mode and reservation mode permits allow a NT 26 to "request" additional upstream bandwidth, i.e., a for transmission of upstream data comprising one or more service go types of varying priorities. A variation of a reservation mode permit includes a "scheduled mode" permit that is used to assign a specific, fixed amount of upstream bandwidth to a given NT 26, e.g., for a handling low CDV telephony traffic carried in substantially evenly spaced upstream ATM cells.

Each NT 26 associated with the respective downstream carrier channel receives and evaluates each downstream frame 48 to determine whether it is an intended recipient of either an enclosed permit 50, or of some or all of the payload data 52 contained therein. An NT 26 may thereafter respond to a permit 50 contained in a downstream frame 48 by attaching a header containing a "request" slot 60 to an upstream ATM payload cell 62 to , to thereby form an upstream data frame 58, which is then transmitted upstream by the NT 26 to the HEMAC 28. Although upstream frames 58 may differ significantly in bit-size and, thus, data rate from the downstream frames 48, they are still transmitted and received, respectively, at the same interval timing. As explained in greater detail herein, the varying upstream transmission distances between the NTs 26 is compensated for by imposing a calculated transmission delay at each respective NT 26, i.e., depending on its respective distance from the headend 22. In this manner, upstream data frames 58 arrive serially at the headend 22—i.e., without interfering with each other—in successive intervals corresponding to the respective downstream transmission interval of the headend 22.

Referring to FIG. 3, the downstream data frames 48 are configured to be compatible with existing DVB modem transmission framing and forward error correction ("FEC") standards at the physical layer. In accordance with a still further general aspect of the '088 application, preferred downstream data frames 48 are formed by even pairs of DVB compatible frame slots ("DVB slots"), designated as "A" and "B", respectively, wherein each successive downstream data frame 48 is transmitted from the headend 22 during a 250 usec interval, regardless of the number of DVB slot pairs it contains. Exemplary preferred downstream frame configurations include a first frame 70 comprising a double DVB slot pair (i.e., with four total DVB slots), a second frame 72 comprising a triple DVB slot pair (i.e., with six total DVB slots), and a third frame 74 comprising a quadruple DVB slot pair (i.e., with eight total DVB slots), respectively, wherein each of the respective DVB slot pairs "A–B" in each of the frame configurations 70, 72 and 74 are identical.

Figure 4:
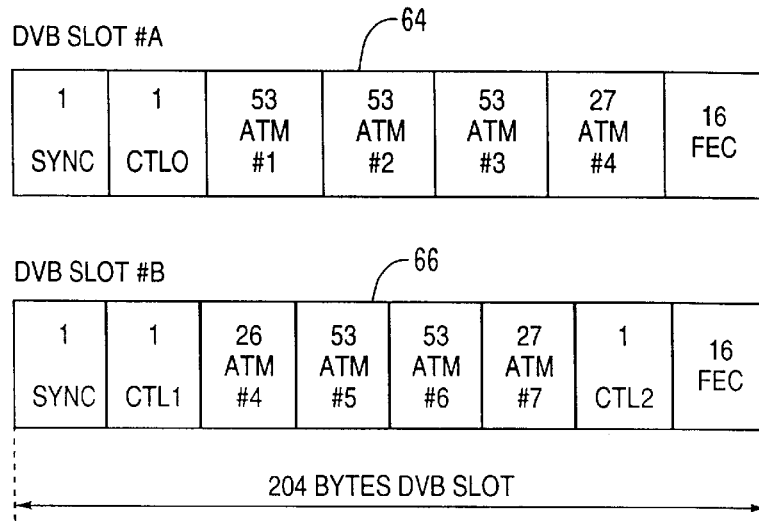

Referring to FIG. 4, in conformance with DVB modem frame transmission standards, DVB slots A and B each comprise two hundred and four data bytes, wherein the respective A–B slot pairs are transmitted serially by the headend 22, i.e., from left to right. In particular, DVB slot "A" (64) of each A–B pair is formed by an initial synchronization ("sync") byte, which is followed by a first control byte ("CTL0"), three successive fifty-three byte ATM cells (#s 1–3), the first twenty-seven bytes of a fourth ATM cell (#4), and sixteen bytes of FEC information, respectively. DVB slot "B" (66) also begins with a synch byte, which is followed by a second control byte (CTL1), the remaining twenty-six bytes of ATM cell (#4), three additional fifty-three byte ATM cells (#s 5–7), a third control byte (CTL2), and sixteen bytes FEC information, respectively.

Thus, as can be calculated from the respective DVB slot pair configurations, and based on the preferred downstream frame transmission timing of 250 usec, the four DVB slot downstream frame 70 provides a transmission rate of 26.112 Mbps, which is compatible for DVB modem transmission at either 64 QAM in a 6 MHz channel or at 16 QAM in a 8 MHz channel; the six DVB slot downstream frame 72 provides a transmission rate of 39.168 Mbps, which is compatible for modem transmission at either 256 QAM in a 6 MHz channel or at 64 QAM in an 8 MHz channel; and the eight DVB slot downstream frame format 74 provides a transmission rate of 52.224 Mbps, which is compatible for modem transmission at 256 QAM in an 8 MHz channel, respectively.

In preferred embodiments, a sixty-eight byte upstream data frame 58 (not shown in FIG. 4) is employed, which provides an upstream data rate of 2.176 Mbps, based on the preferred 250 usec upstream transmission interval. This upstream data frame length is advantageously evenly divisible into any of the aforementioned exemplary preferred downstream frame format rates—i.e., at a 12:1 ratio with respect to the four DVB slot frame 70; at an 18:1 ratio with respect to the six DVB slot frame 72; and at a 24:1 ratio with respect to the eight DVB slot frame 74, respectively. Various preferred upstream frame configurations are described in greater detail in conjunction with FIGS. 9–15.

Figure 5:
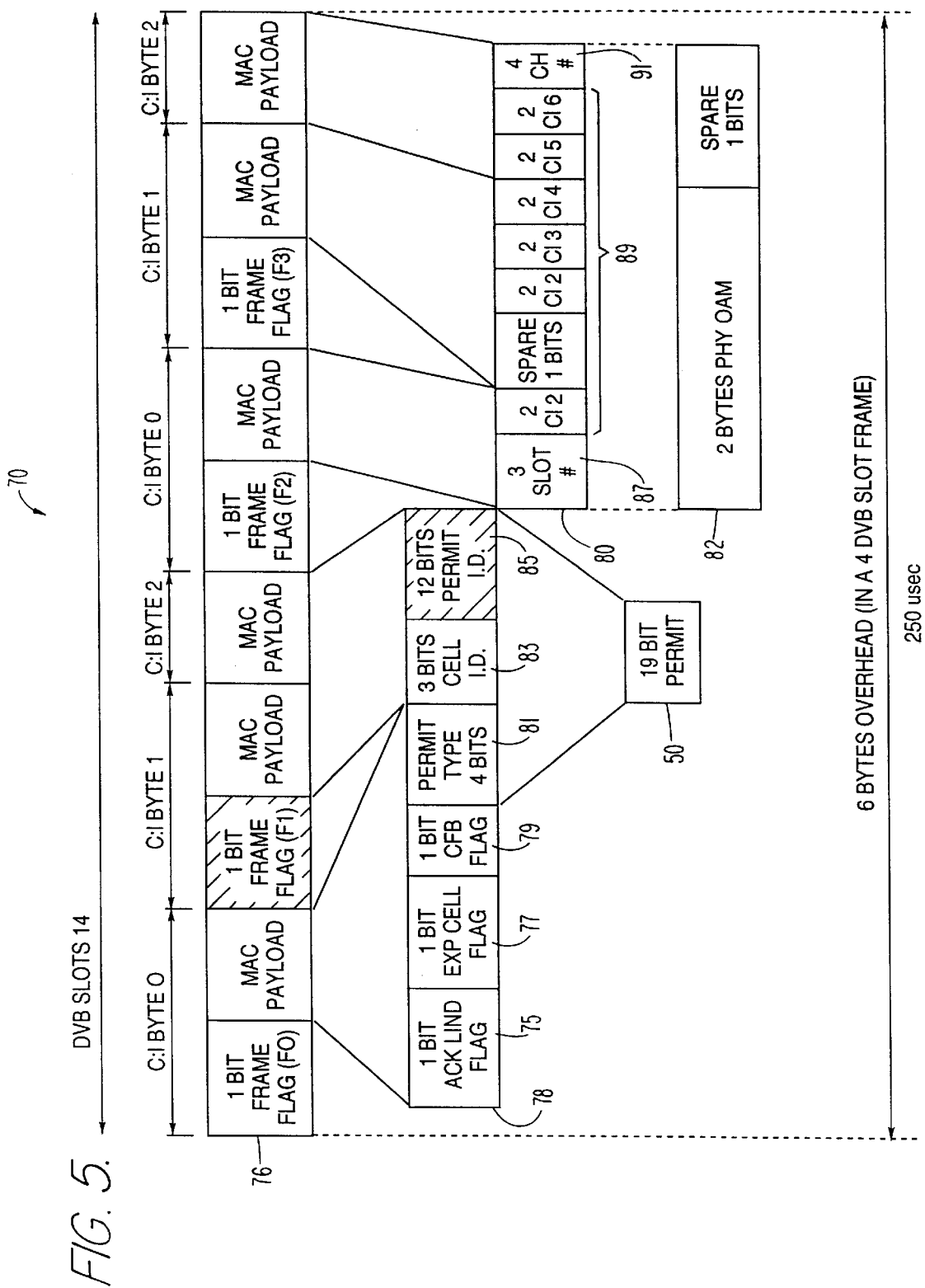

Referring to FIG. 5, a four DVB slot downstream frame 70 is depicted with the respective sync, ATM cell and FEC bytes omitted for purposes of illustrating a preferred control byte configuration. In accordance with yet another general aspect of the '088 application, the respective control bytes retain their DVB standard position, but their content has been altered for purposes of upstream bandwidth allocation by the HEMAC 28. In particular, control bytes CTL0–2 of the first DVB slot pair (i.e., DVB slots "one" and "two") are serially aligned with the respective control bytes CTL0–2 of the second DVB slot pair (i.e., DVB slots "three" and "four") to form a six byte control subframe 76. The control subframe 76 is used to carry MAC overhead from the HEMAC 28 to the respective NT MACs 38, including the respective upstream transmission permits 50 used by the HEMAC 28 to assign upstream bandwidth to respective NTs 26.

With respect to the first DVB slot pair of the control subframe 76, control byte CTL0 includes a first (one bit) frame flag F0 and seven bits MAC payload data; control byte CTL1 includes a second (one bit) frame flag F1 and seven bits MAC payload data; and control byte CTL2 includes eight bits MAC payload data, respectively. The collective twenty-two bits of MAC payload data from these first three control bytes CTL0–2 form a MAC control data field 78. The MAC control data field 78 includes three indicator bit flags: an acknowledge window flag 75, an ATM expansion channel indicator flag 77 and a collision feedback indicator flag 79, respectively, followed by a nineteen bit upstream transmission permit 50. As illustrated in greater detail below, the flag 75 is used to mark the beginning of a new series of downstream data frames 48 for tracking downstream data transmission; flag 77 is used to indicate whether an ATM expansion cell 96 (explained in conjunction with FIG. 8) is used in the present downstream data frame 48; and flag 79 is used to indicate whether collision feedback information is present in data field 80 (explained below).

The permit field 50 includes a four bit "permit type" field, a three bit "call ID" field and a twelve bit "permit ID" field, respectively. In particular, the permit type field 81 distinguishes between different "types" of upstream data to be transmitted by a respective NT 26 in response to receiving the permit 50. In a currently preferred embodiment, upstream transmission data types include constant bit rate ("CBR"), variable bit rate ("VBR") and unassigned bit rate ("UBR") services, respectively, each of which are transported in a standard ATM cell format. The permit type field 81 is also used to indicate the type of upstream transmission that is offered, i.e., whether it is a reserved slot or whether it may be contended for by some or all of the NTs 26. The call ID field 83 is used to identify a specific calling channel or line for CBR service at a specified NT. The permit ID field 85 is used to identify a specific NT 26, or group of NTs, if applicable, that may respond to the permit. A more detailed description of the permit type 81, Call ID 83, and permit ID 85 fields is provided below in conjunction with FIGS. 9–18.

In the second DVB slot pair of frame 70, control byte CTL0 includes a third (one bit) frame flag F2 and seven bits MAC payload data; control byte CTL1 includes a fourth (one bit) frame flag F3 and seven bits MAC payload data; and control byte CTL2 includes eight bits MAC payload data, respectively. The collective twenty-two bits MAC payload data of the second DVB slot pair may be used to carry either a twenty-one bit collision feedback information field 80 (with one bit spare) or, alternately, a two byte OAM data field 82 (with six bits spare). If a collision feedback data field 80 is being transmitted, the flag 79 is set (i.e., with a "1"); otherwise an OAM data field 82 is presumed.

In particular, a collision feedback data field 80 contains a five bit slot identification number 87, followed by six, two-bit collision identification flags 89, and a four bit channel identification number 91, respectively, the use of which is described in greater detail below, in conjunction with FIG. 9. An OAM data field 82 is used for transporting two bytes of OAM data from the headend facility 22 to respective NT locations 26. In a presently preferred embodiment, a protocol for using the OAM data field 82 is left open as a design choice by the network implementor.

Figure 6:
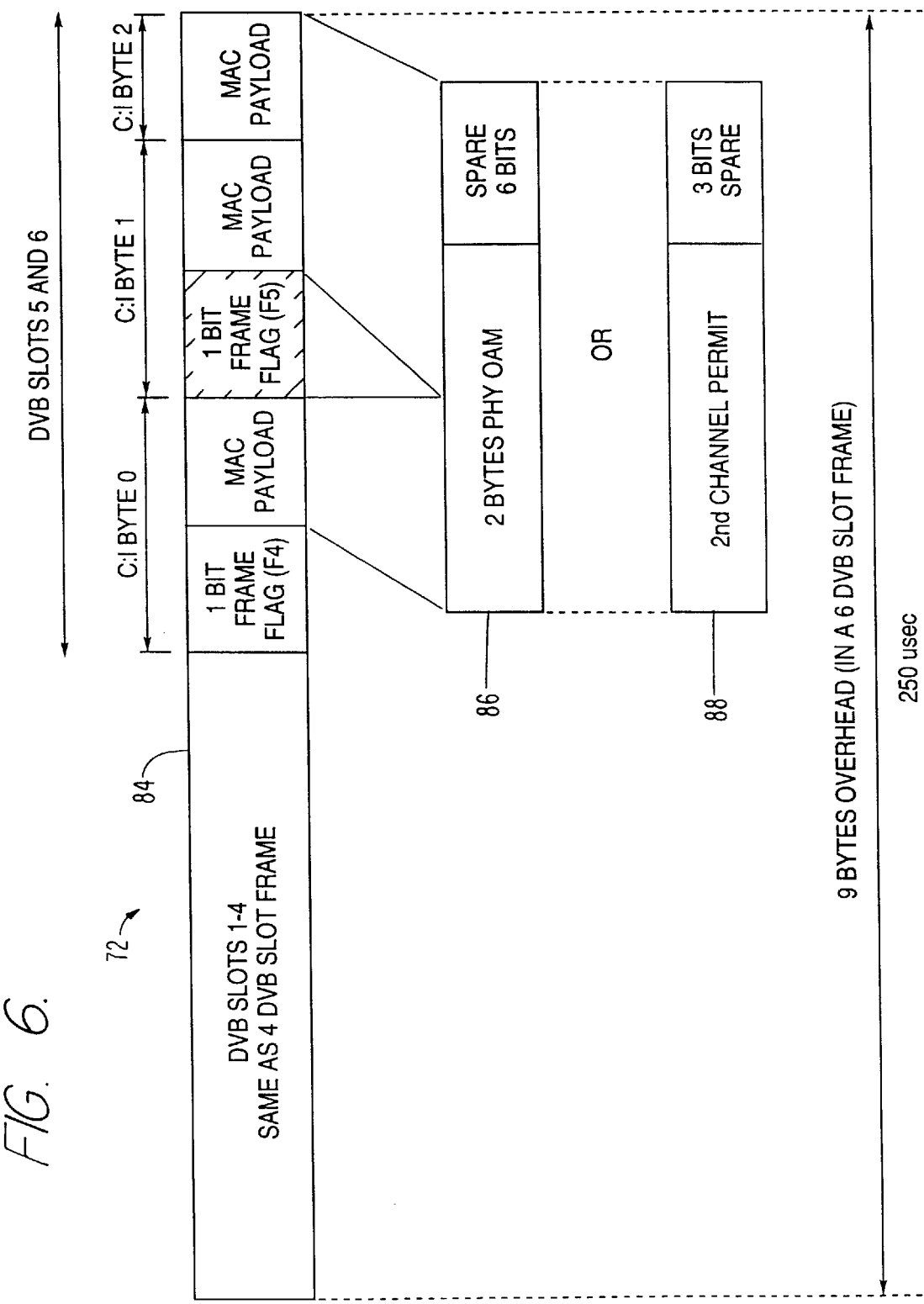

Referring to FIG. 6, a six DVB slot downstream frame 72 is also depicted without the sync, ATM cell and FEC bytes, respectively, wherein the collective nine control bytes of frame 72 form an "expanded" control subframe 84. The first six control bytes (i.e., from the first four DVB slots) of the expanded control subframe 84 are allocated in the exact manner as in control subframe 76 of FIG. 5, including a nineteen bit upstream transmission permit 50.

In accordance with yet another general aspect of the '088 application, only one permit field 50 is used in each downstream data frame per upstream RF carrier channel. Thus, if only a single upstream carrier channel is employed in network 20, the remaining three control bytes of subframe 84 (i.e., control bytes CTL0–2 of DVB slots "five" and "six"), which also includes fifth and sixth (one bit) frame flags F4 and F5, respectively, are used for other purposes, such as for an additional two byte OAM data field 86. It may be desirable to expand upstream network capacity by utilizing an additional RF carrier channel for upstream frame transmission—i.e., where a first group of NTs 26 are associated with a first selected upstream RF carrier channel and a second group of NTs 26 are associated with a second selected upstream RF carrier channel, respectively. In this case, the final three control bytes of expanded control subframe 84 are used to transmit a nineteen bit "second channel" upstream transmission permit 88, which comprises a respective four bit permit type field, three bit call ID field, and a twelve bit "permit ID" field, (not shown), respectively, for a second upstream RF carrier channel.

Figure 7:
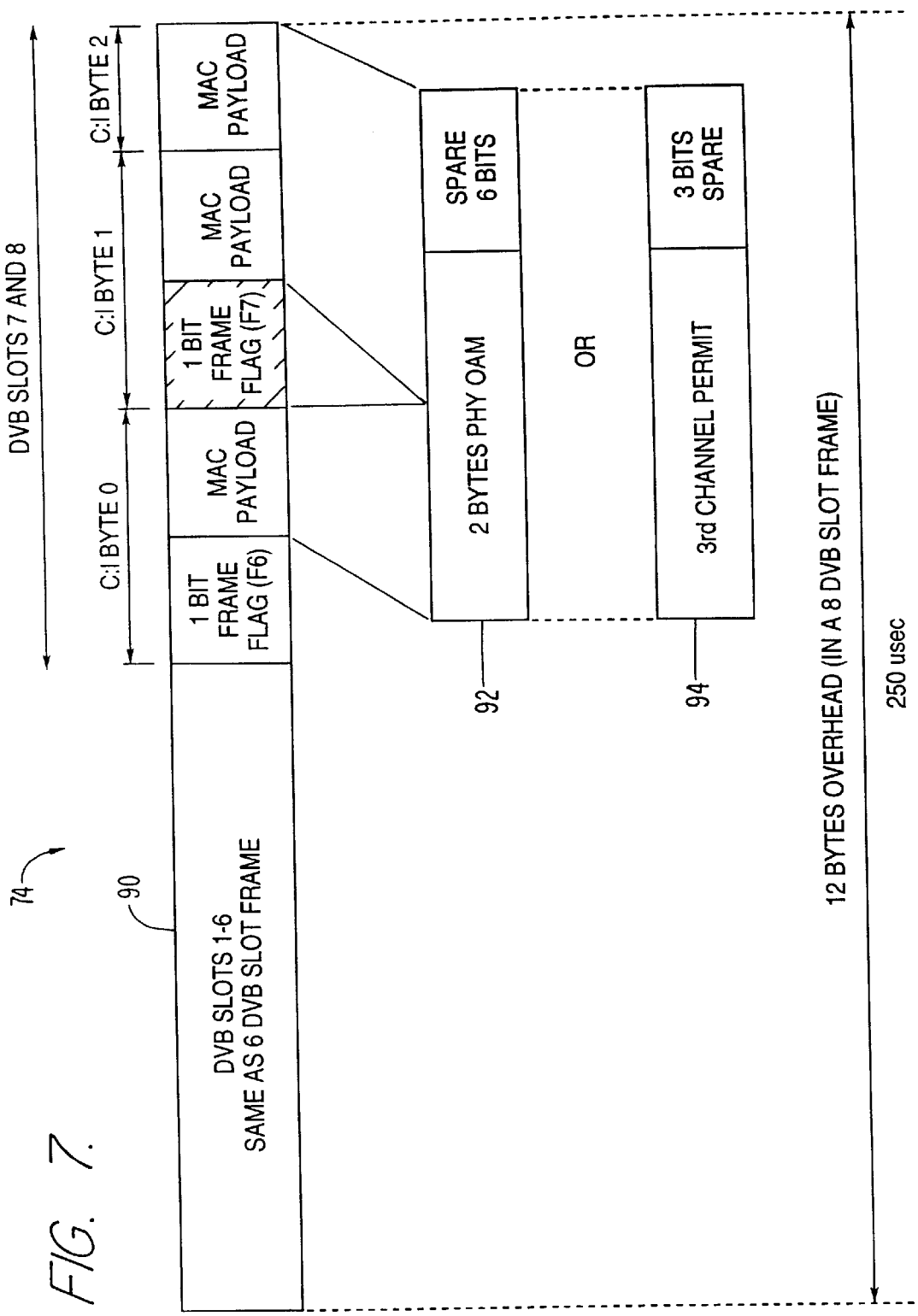

Referring to FIG. 7, capacity for yet another upstream carrier channel is provided by employing an eight DVB slot downstream frame 74, wherein the collective twelve control bytes of frame 74 form a "further expanded" control subframe 90. The first nine control bytes (i.e., from the first six DVB slots) of the further expanded control subframe 90 are allocated in the exact manner as in the expanded control subframe 84 of FIG. 6,—i.e., including a first channel permit 50 and either an (additional) OAM data field 86 or a second channel permit 88, respectively. The remaining three control bytes (i.e., control bytes CTL0–2 of DVB slots "seven" and "eight"), are used to transmit yet another two byte OAM data field 92, or a nineteen bit "third channel" upstream transmission permit 94. The third channel permit 94 includes a respective four bit permit type field, three bit call ID field, and a twelve bit "permit ID" field, (not shown), for a third upstream RF carrier channel. The final three control bytes of subframe 90 also include seventh and eighth (one bit) frame flags, F6 and F7, respectively.

Figure 8:
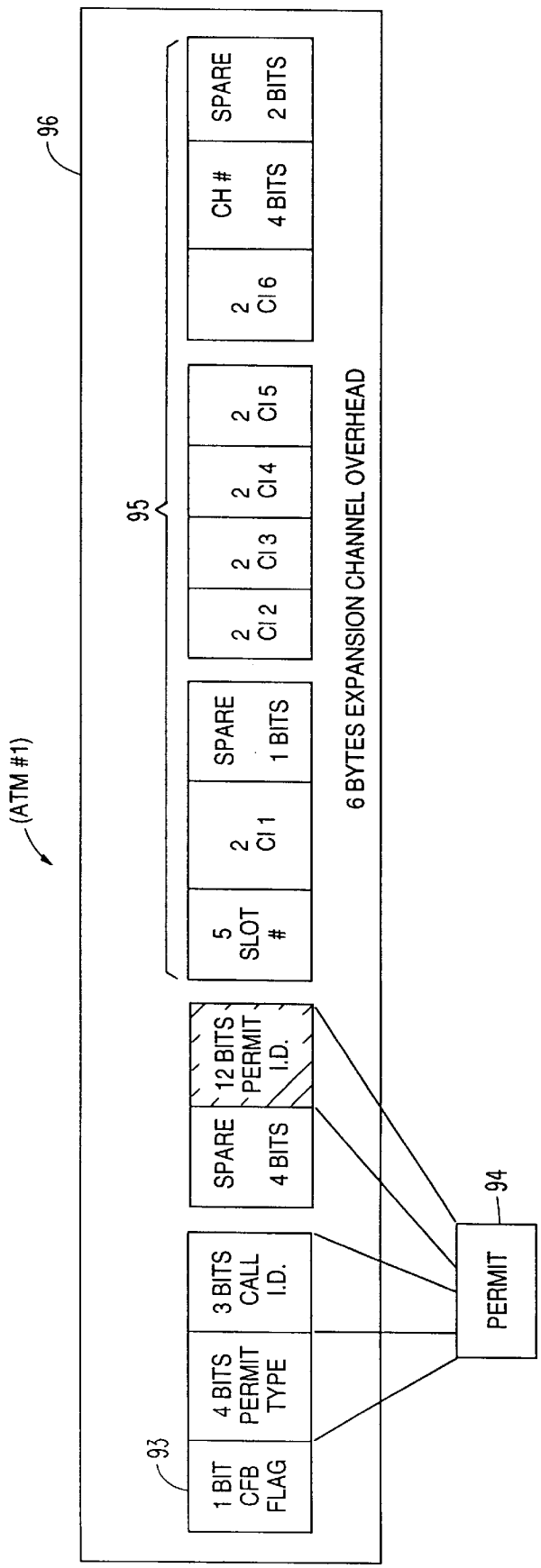

Referring to FIG. 8, additional upstream carrier channels may also be controlled by expanding into the space starting after the first five bytes of the first ATM cell—i.e., ATM cell #1 in DVB slot "one"—of the respective downstream frame 48. In particular, a six byte ATM "expansion channel" 96 is allocated in a manner similar to the six byte control subframe 76 depicted in FIG. 5, except that no framing bits are needed. Up to eight, six byte control subframes may be added to the first ATM cell following the excluded first five bytes. The use of an ATM expansion channel 96 is indicated by setting flag 77 in the MAC control field 78 of the first DVB slot of the respective frame 48. In a presently preferred embodiment, a six byte expansion channel 96 includes a further one bit collision feedback flag 93, a further channel upstream permit 94, and an associated collision feedback data field 95, respectively. The further upstream permit 94 is identical in format to permit 50, and may be used as an alternate second or third channel permit—i.e., where only a four or six DVB slot frame configuration is employed. Likewise, the collision feedback data field 95 is identical in format to field 80, wherein use of field 95 is indicated by setting flag 93.

Although the use of multiple upstream channels is thus provided for in the present preferred embodiment, for purposes of ease in illustration, only a single upstream channel—i.e., associated with the 1st channel permit 50—will be illustrated in conjunction with the remaining drawings, unless otherwise indicated.

Figure 9:
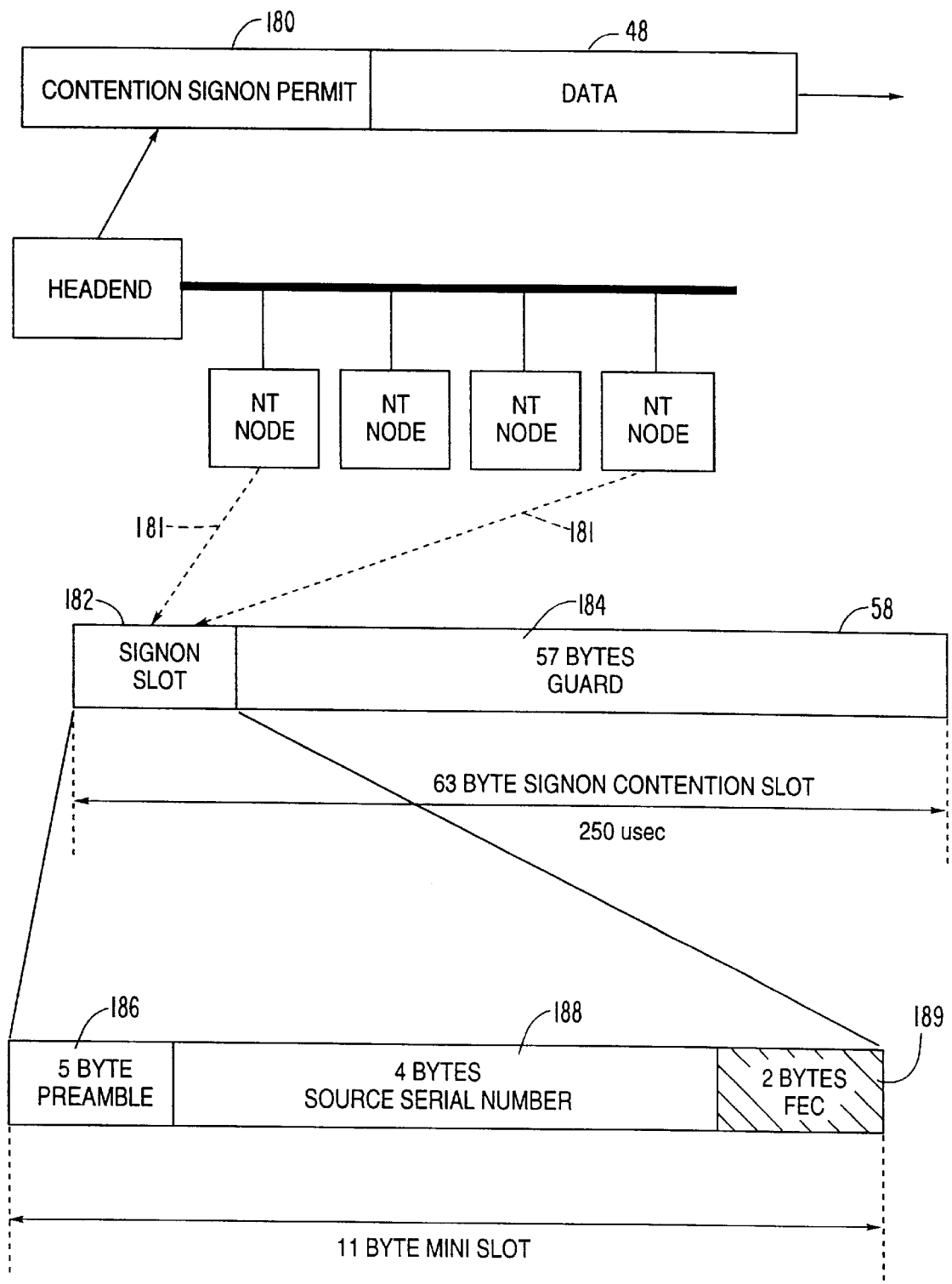

Referring to FIG. 9, in order to determine if any new NTs 26 have been activated in the network 20, the HEMAC 28 periodically transmits a downstream contention "signon" permit 180 for each active upstream carrier channel. In particular, referring back to FIG. 5, the HEMAC 28 inserts a selected four bit binary code in the permit type field 81 of permit 50 to indicate that the permit is for a responsive signon slot, and a selected twelve bit binary code in the permit ID field 85 (i.e., "all NTs"), which indicates that any NT 26 may attempt a response. In this manner, a newly activated NT 26 will recognize a contention signon permit 180 and will attempt an upstream response thereto.

Referring back to FIG. 9, as indicated by dashed lines 181, more than one NT 26 can respond to a signon contention signon permit 180,—i.e., it is a contention mode permit. However, preferably only those newly activated NTs 26, i.e., those NTs whose signon has not yet been acknowledged by the HEMAC 28, will attempt a response. More particularly, an NT 26 responding to a signon permit 180 transmits an eleven byte upstream signon slot 182, which is followed by fifty seven bytes of guard (or "blank") space 184, to complete a sixty-eight byte upstream frame 58. In a currently preferred embodiment, the upstream signon slot 182 includes a five byte preamble 186, a four byte unique serial number (e.g., MAC address) 188 of the responding NT 26, and two bytes FEC information 189, respectively. The preamble 186 is used to insure the headend receiver (not shown) can accurately receive and read the data contained in the upstream signon slot 182. Because there is no previously established synchronization between the headend 22 and the respective NT 26, each NT 26 is preferably assigned with a preset transmission delay to correspond with a selected "maximum" transmission delay assigned by the HEMAC 28 (explained in further detail below), so that transmission of a signon slot by a respective NT 26 does not interfere with a previously transmitted upstream frame 58 by another NT. Further, the guard time 184 following the upstream signon slot is included to help insure the signon slot 182 does not interfere with an ensuing upstream data frame 58 transmitted by another NT 26. For this reason, no upstream payload data is transmitted along with the upstream signon slot 182.

Referring again back to FIG. 5 in conjunction with FIG. 9, the collision feedback data field 80 is used by the HEMAC 28 to provide feedback information to the respective NTs 26 regarding the success or failure of an attempted response to a contention signon permit 180. More particularly, in order to track the successive downstream frames 48, a five bit binary slot number is assigned to each frame, wherein the slot numbering starts over after each successive thirty-two frames (i.e., from slot number "00000" to slot number "11111"). The beginning of a new series of slot numbers is indicated by setting flag 75, so that each NT can easily track the respective downstream frames by monitoring the flag and employing a simple frame counter (not shown). As will be apparent to those skilled in the art, this also allows further downstream communication regarding the results of an upstream transmission to be easily identified, so long as it is transmitted by the HEMAC 28 within thirty-two frame periods since the original downstream permit 180 was transmitted.

If a responsive signon slot 182 is successfully received by the HEMAC 28 (i.e., without an inherent transmission problem or collision occurring between respective NTs attempting a response), the collision feedback data field 80 will identify the slot number (i.e., from 00000 to 11111) of the respective downstream frame 48 containing the signon permit in field 87. The first two-bit collision indicator "CI1" in field 89 is then set to "01", with the remaining five two-bit indicators left at zero. In this manner, the successfully responding NT's MAC 38 (which has stored the corresponding slot number of the frame 48 carrying the contention signon permit 180) will know that its signon slot was received by the HEMAC 28.

In a case where two or more NTs 26 transmit an upstream signon slot 182 in response to the same downstream signon permit 180, the HEMAC 28 will set the collision indicator "CI1" in field 89 to "11", indicating that no signon attempt by any NT 26 was effective. A protocol for re-attempting an upstream response by the respective unsuccessful NTs while attempting to avoid further collisions is preferably employed by the respective NTs 26. Such protocols include many known efficient contention resolution Random Access algorithms (RAA), such as the Ternary Tree Binary Feedback (TTRF) algorithm, wherein respective NTs are assigned differing priority numbers. Such an algorithm is tailored to systems with a large number of stations and outperforms ALOHA algorithms without suffering from its stability problems. An overview of known contention resolution algorithms is provided in a paper presented to the IEEE Project 802.14 Working Group entitled, "A review of Random Access Algorithms", by Chatschik Bisdikian of IBM, dated January 1996, which is fully incorporated herein by reference.

In situations where multiple upstream frequency channels are used by the network 20, a four bit "channel number" is provided in field 91 by the HEMAC 28 to identify which upstream channel the information in field 80 applies to. A description of the use of the remaining two-bit collision indicators in field 89 is described below in conjunction with FIG. 15.

Figure 10:
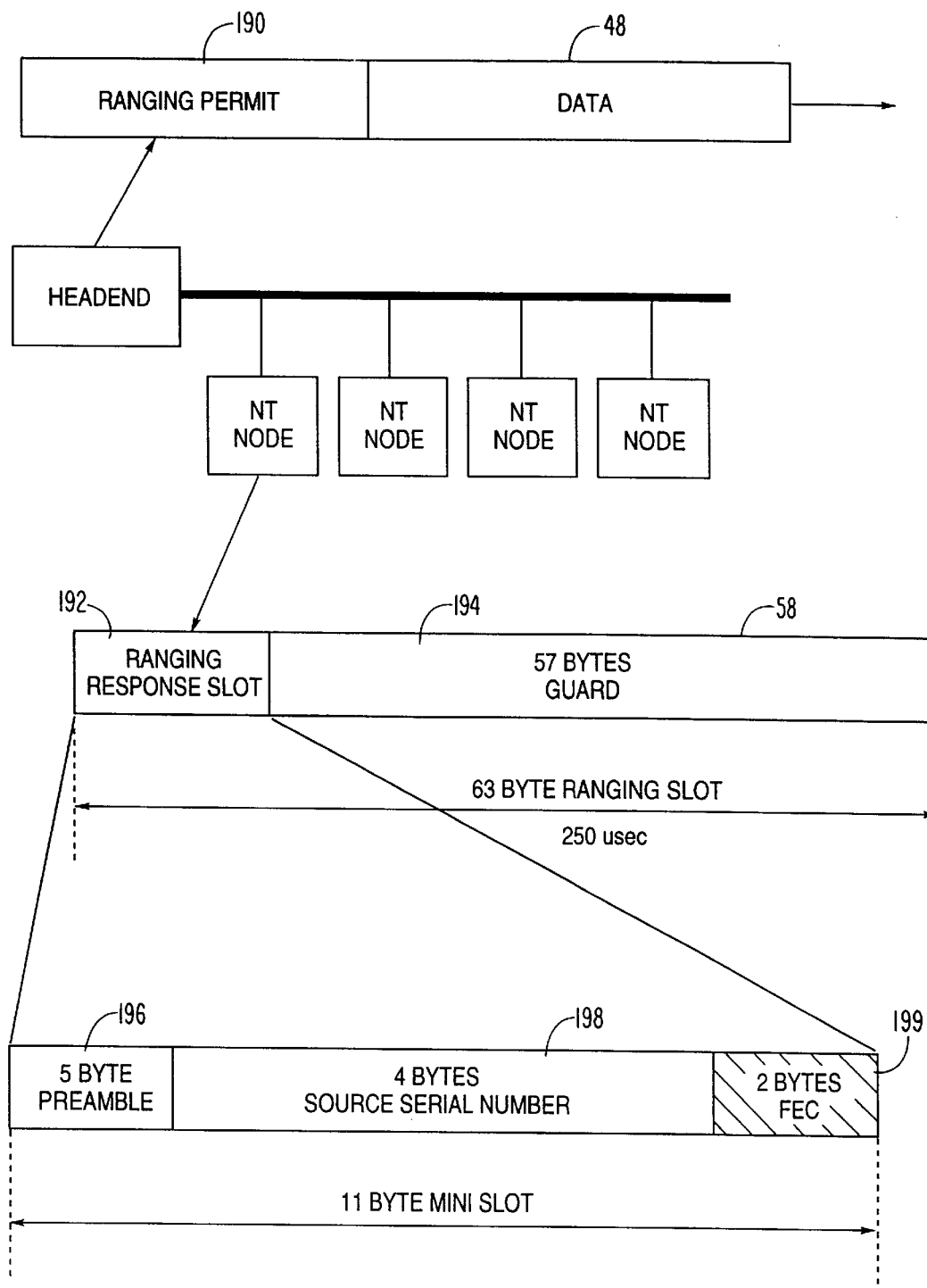

Referring to FIG. 10, where an NT 26 does successfully submit a signon slot 182 to the HEMAC 28, it assumes the particular twelve bit NT ID transmitted in the particular downstream signon permit 180. The HEMAC then transmits a "ranging permit" 190 to the respective NT 26 in order to determine (and subsequently adjust) the round trip transmission interval between the two units. In particular, the ranging permit 190 is addressed only to the specific NT 26, by way of the 12 bit permit ID field 85. Thus, there is no "contention" situation between respective NTs 26, as only the specifically identified NT may respond.

To respond to a ranging permit 190, the polled NT 26 transmits an eleven byte ranging slot 192, followed by fifty seven bytes of guard space 194. The ranging slot 192 includes a five byte preamble 196, the four byte unique serial number 198 for the respective NT 26, and two bytes FEC information 199, respectively. The HEMAC 28 tracks the time between when it transmits the downstream ranging permit 190 and when it receives the responsive ranging slot 192 from the respective NT 26 and compares the round trip transmission time against the currently existing maximum delay time and calculates the difference in order to set the proper delay for the respective NT 26. The respective delay information is then transmitted to the particular NT 26 as part of the OAM provisioning data contained in an ensuing downstream data frame 48.

Figure 11:
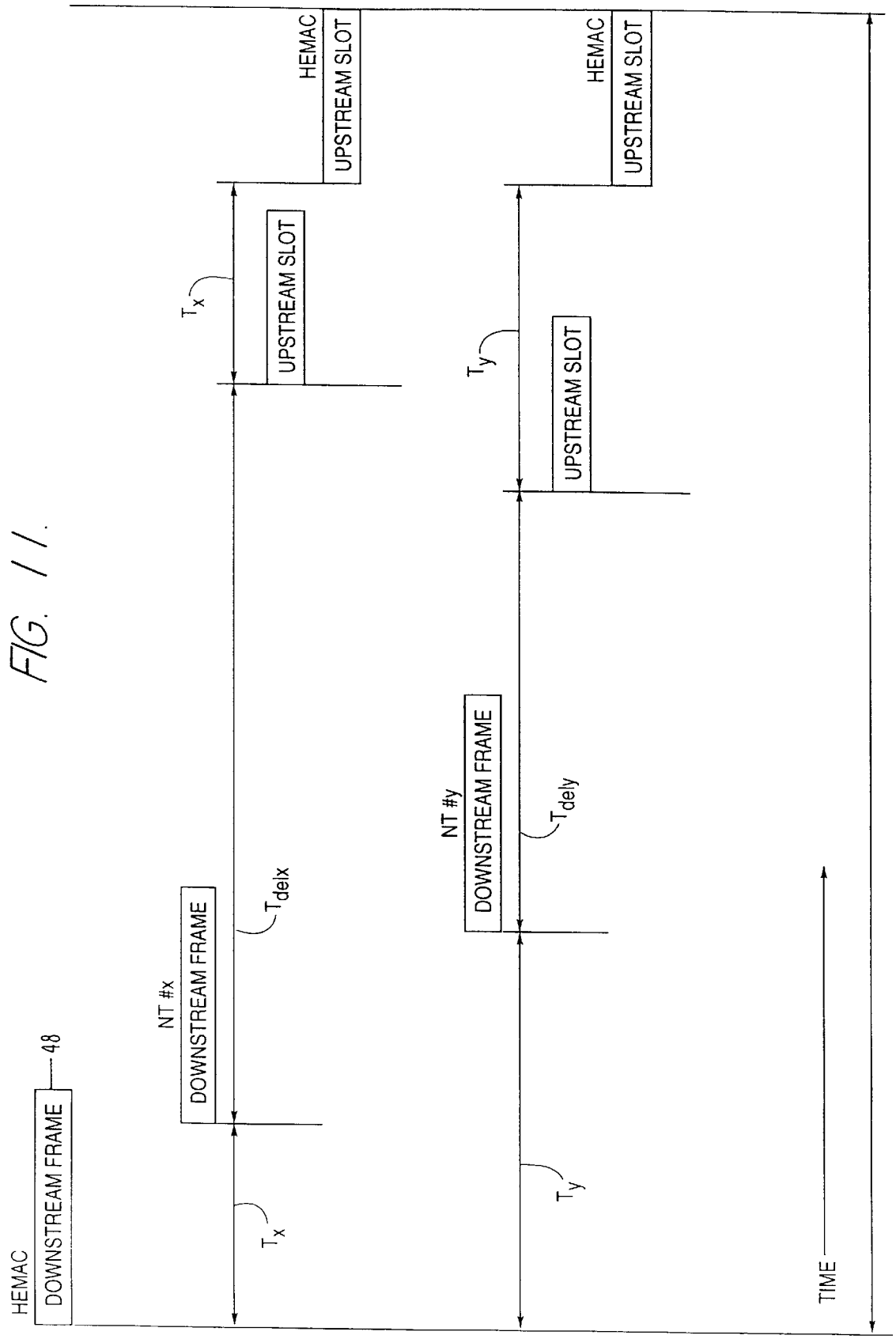

By way of illustration, referring to FIG. 11, a downstream frame 48 is transmitted from the headend 22 and is received at NT#x after a transmission interval of $T_x$, and is received at NT#y after a transmission interval of $T_y$. NT#x imposes a delay of $T_{delx}$, and NT#y imposes a delay of $T_{dely}$, respectively, before each transmits a respective upstream response, e.g., to a contention permit contained in the respective downstream frame. Based on the ranging permit process, the HEMAC sets the respective delays, $T_{delx}$ and $T_{dely}$, such that the total round trip transmission time is the same for both NT#x nd NT#y, i.e., $2T_x+T_{delx}=2T_y+T_{dely}$. In this manner, all upstream frames 58 will arrive serially at the headend 22, regardless of the differences in round trip transmission times between respective NTs 26. Where the transmission interval of a respective NT 26 is found to exceed the previous maximum delay time, the HEMAC will accordingly update each of the NTs 26 with a compensating delay value equal to or greater than the new maximum network terminal delay interval.

Because the initial transmission delay for receiving a response to either a contention signon permit 180 or ranging permit 190 is not known, a number of "blanking slots" (not shown) are preferably inserted following the transmission of either one of these permits. A blanking slot is simply a non-transmitting, or "quiet" period, equal in length to the normal frame interval timing (i.e., 250 usec). In this manner, the responding NTs 26 to a signon permit 180 or ranging permit 190 are afforded an additional time interval for their upstream transmission to reach the head-end 22, without interfering with an ensuing upstream response to a subsequent permit from a closer NT.

Further, where the respective round trip transmission time of a particular NT 26 exceeds the total frame transmission slot time (i.e., 250 usec in the illustrated preferred embodiments), no further delay can be accommodated, since this will cause interference between sequential adjacent upstream frames 58. Instead, one or more blanking slots must be permanently inserted by the HEMAC 28 following each downstream frame 48 transmission in which one or more such "long distance" NTs are eligible to respond. In order to maintain efficient utilization of network bandwidth, however, the respective NTs 26 of a preferred network 20 should be sufficiently close to the headend 22 so that the number of blanking slots required to insure receipt of signon and ranging responses does not cause overall network bandwidth utilization to suffer.

Figure 12:
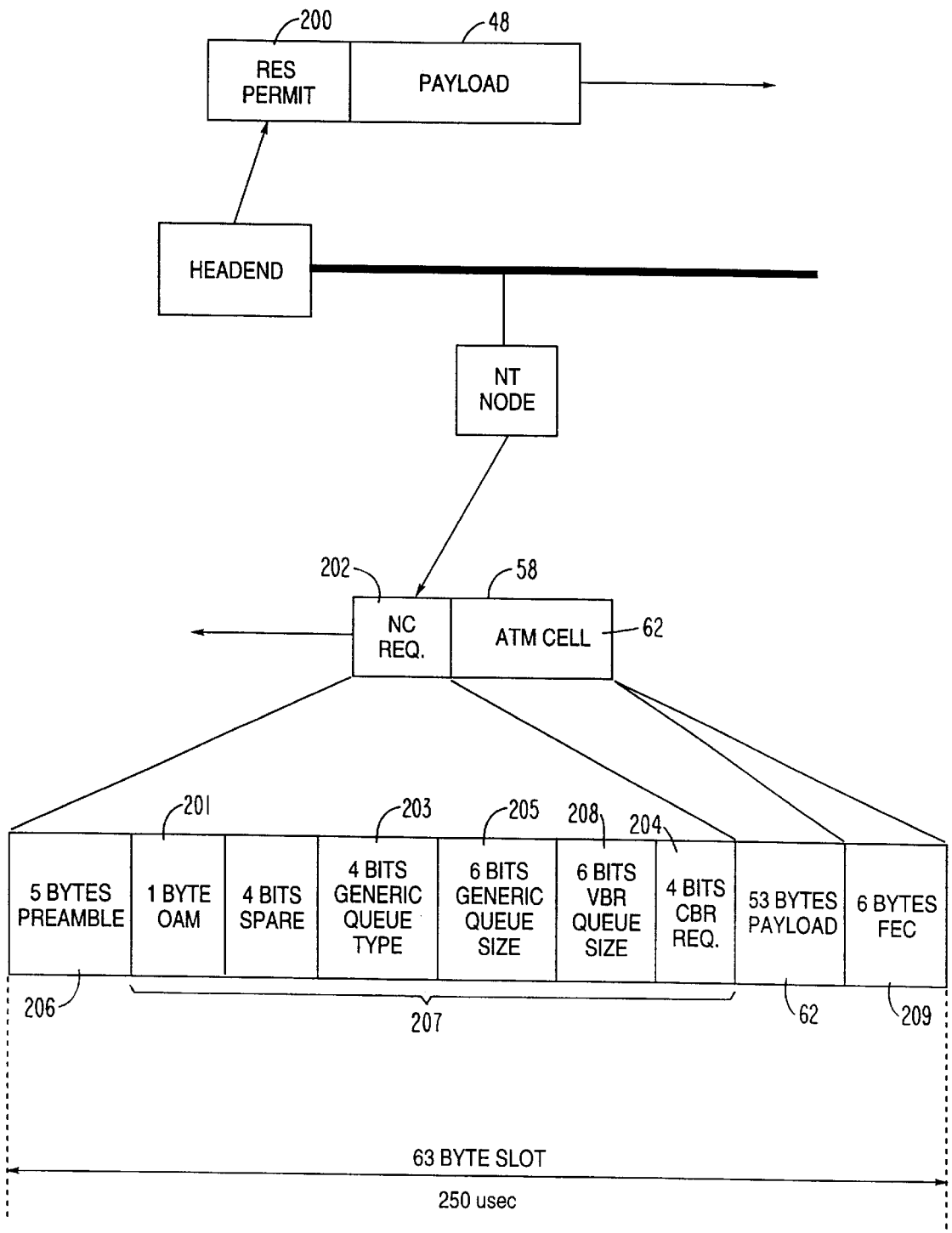

Referring to FIG. 12, in accordance with yet another general aspect of the '088 application, the HEMAC 28 will periodically transmit a reservation mode permit 200, which allows for the upstream transmission of an ATM payload cell 62 by a specific NT 26. The HEMAC 28 identifies the permit type as being "reservation mode" by a selected code in the permit type field 81 of the downstream permit 200, with the particular NT 26 being identified in the 12 bit permit ID field 85.

The specified NT 26 responds to the reservation mode permit 200 by transmitting an upstream data frame 58 containing a non-contention request slot 202, followed a fifty-three byte ATM payload cell 62 and six bytes of FEC information 209, respectively. The non-contention request slot 202 includes a five byte preamble 206 and a four byte non-contention request 207. The non-contention request 207 includes contains a one byte OAM field 201, four bits spare, a four bit "generic queue type" field 203, a six bit "generic queue size" field 205, a six bit "VBR queue size" field 208, and a four bit "CBR request" field 204, respectively. As explained in greater detail below in conjunction with FIGS. 16–17, the VBR queue size field 208 is used by the NTMAC 38 to inform the HEMAC 28 of the number of ATM payload cells 62 it has waiting in its VBR queue (shown in FIG. 16). The generic queue size field 205 is used by the respective NTMAC 38 to inform the HEMAC 28 of the number of ATM payload cells 62 it has waiting in a given queue of a service type indicated by a selected code in the generic queue type field 203. The CBR request field 204 is used by the respective NT MAC 38 to request CER bandwidth for up to four CER connections—, i.e., wherein each respective bit is used to indicate whether an associated telephone line or connection at the respective NT 26 is "off-hook".

Figure 13:
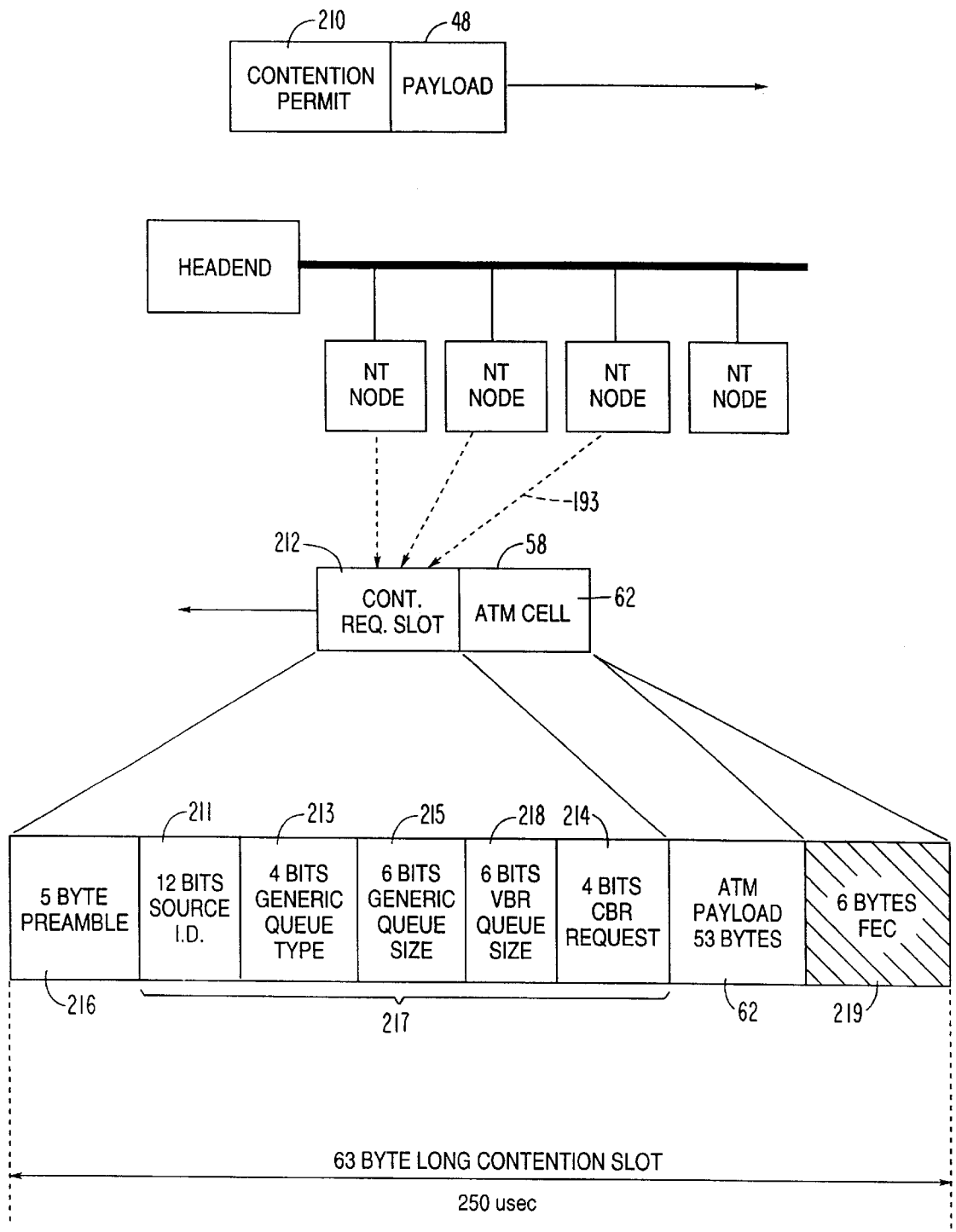

Referring to FIG. 13, the HEMAC 28 may also periodically transmit a contention mode permit 210, which allows for the upstream transmission of an ATM payload cell 62 by a responsive NT 26, but is "contention based," so that any NT 26 may respond, as indicated by dashed lines 193. The HEMAC 28 identifies the permit type as being "contention mode" by a selected code in the permit type field 81 of the downstream permit 200. In a presently preferred embodiment, the HEMAC may designate either one or more particular groups of NTs 26, or all NTs 26, as being eligible to respond to the contention mode permit 210, by inserting a particular 12 bit group code in the permit ID field 85.

An NT 26 responds to a contention based ATM permit 210 by transmitting an upstream data frame 58 containing a "contention request" slot 212 followed a fifty-three byte ATM payload cell 62 and six bytes of FEC information 219, respectively. The contention request slot 212 includes a five byte preamble 216 and a four byte contention request 217. The contention request 217 includes a twelve bit source ID field 211, a four bit generic queue type field 213, a six bit generic queue size field 215, a six bit VBR queue size field 218, and a four bit CDR request field 214, respectively. The respective generic queue type field 213, generic queue size field 215, VBR queue size field 218, and CBR request field 214 are used in an identical manner as fields 203, 205, 208 and 204, respectively, of a non-contention request—i.e., a contention request 217 is the same as a non-contention request 207, except that the twelve OAM/spare bits of the later are used as a source I.D. field 211 in the former for a inserting a responding NT's MAC address.

In a presently preferred embodiment, the collision feedback data field 80 is used by the HEMAC 28 to provide feedback information to the respective NTs 26 regarding the success or failure of an attempted response to a contention mode permit 210 in the exact same manner as with the contention signon response slots 182 described above in conjunction with FIG. 9. In the case where two or more NTs 26 transmit an upstream contention request slot 212 in response to the same downstream contention mode permit 210, the HEMAC 28 will set the collision indicator "CI1" in field 89 to "11", indicating that no ATM payload cell 62 was received and that retransmission is required, e.g., in accordance with the afore-described RAA algorithms. Again, in situations where multiple upstream frequency channels are employed by the network 20, a four bit "channel number" is provided in field 91 by the HEMAC 28 to identify which upstream channel the information in field 80 applies to.

Figure 14:
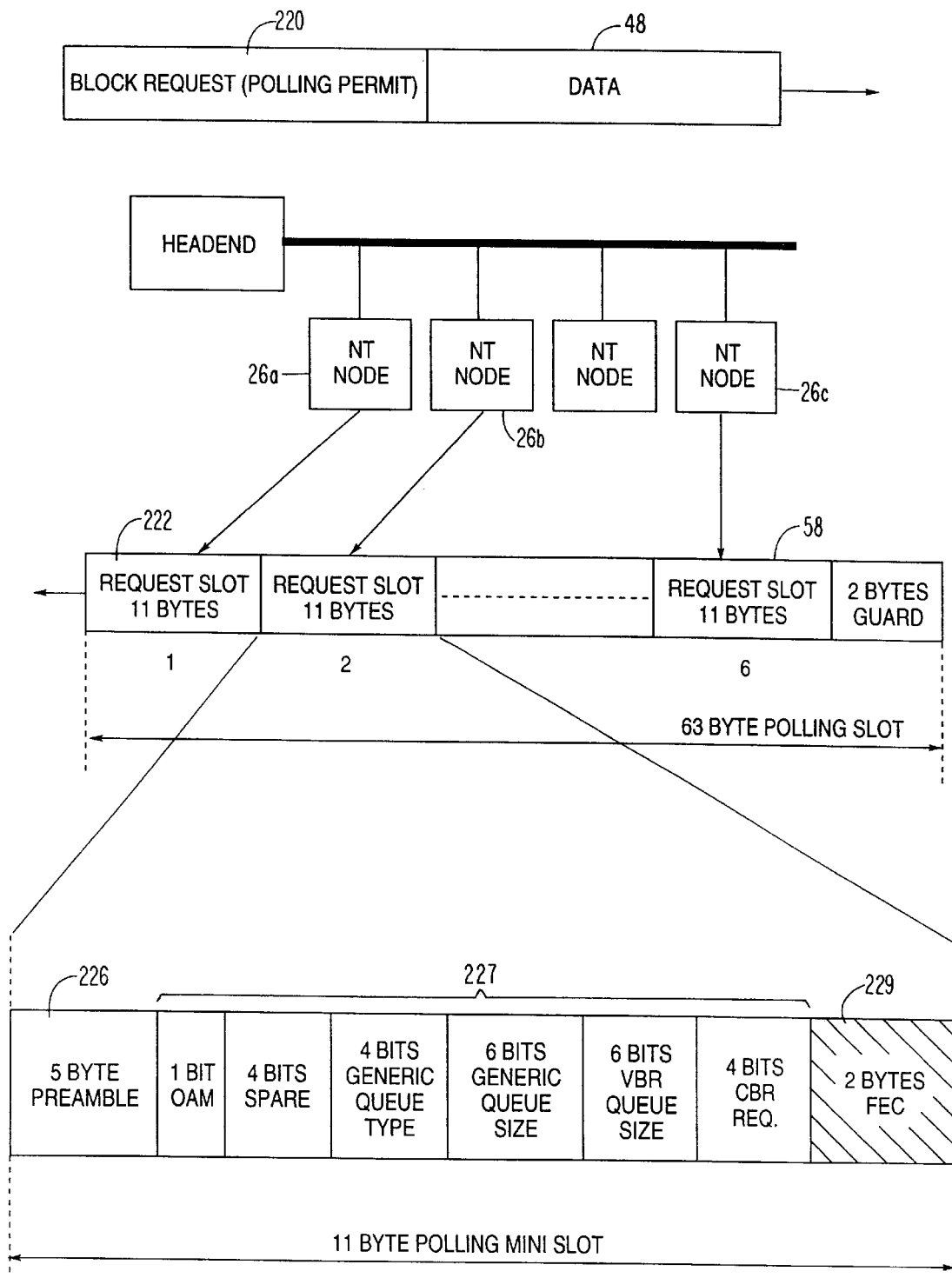

Referring to FIG. 14, the HEMAC 28 may also periodically transmit a "block request" polling permit 220, which polls up to six different NTs 26 on an individual (i.e., reservation mode) basis, to allow for each designated NT 26 to send an eleven byte upstream "mini request slot" 222 in a respective reserved request slots 222. The HEMAC 28 identifies the permit type as being a "block request" by a selected code in the permit type field 81 of the downstream permit 220. In a presently preferred embodiment, the HEMAC 28 assigns (e.g., by way of provisioning information sent in past OAM data fields) each NT 26 to belong to one or more "polling groups" of up to six NTs. Each NT 26 in a particular polling group is also assigned a "mini slot" position number, i.e., from one to six.

To respond to the block request permit 220, the selected NTs of the polling group identified by a selected code in the 12 bit permit ID field 85 each transmit an eleven byte mini request slot 222 in its selected slot position. By way of example, in the preferred embodiment depicted in FIG. 14, NTs 26a, 26b and 26c each belong to a selected polling group, wherein NT 26a is assigned to mini slot 1, NT 26b is assigned to mini slot 2 and NT 26c is assigned to mini slot 6, respectively, for their respective response transmission, wherein the total transmission interval of the mini slots is equal to the total 250 usec upstream frame interval. In a presently preferred embodiment, each NT MAC 38 is provided with a separate delay counter for determining its transmission slot timing, in addition to the afore-described transmission delay of the respective NT 26 due to its distance from the headend 22.

Each mini request slot 222 includes a five byte preamble 226 followed by a four byte request 227 that is identical to a non-contention request slot 207 (described above in conjunction with FIG. 12) and two bytes FEC 229. As will be apparent to those skilled in the art, the twelve bit ID of the respective NTs is not required, since the HEMAC 28 already knows which NTs 26 are responding in each mini slot.

Figure 15:
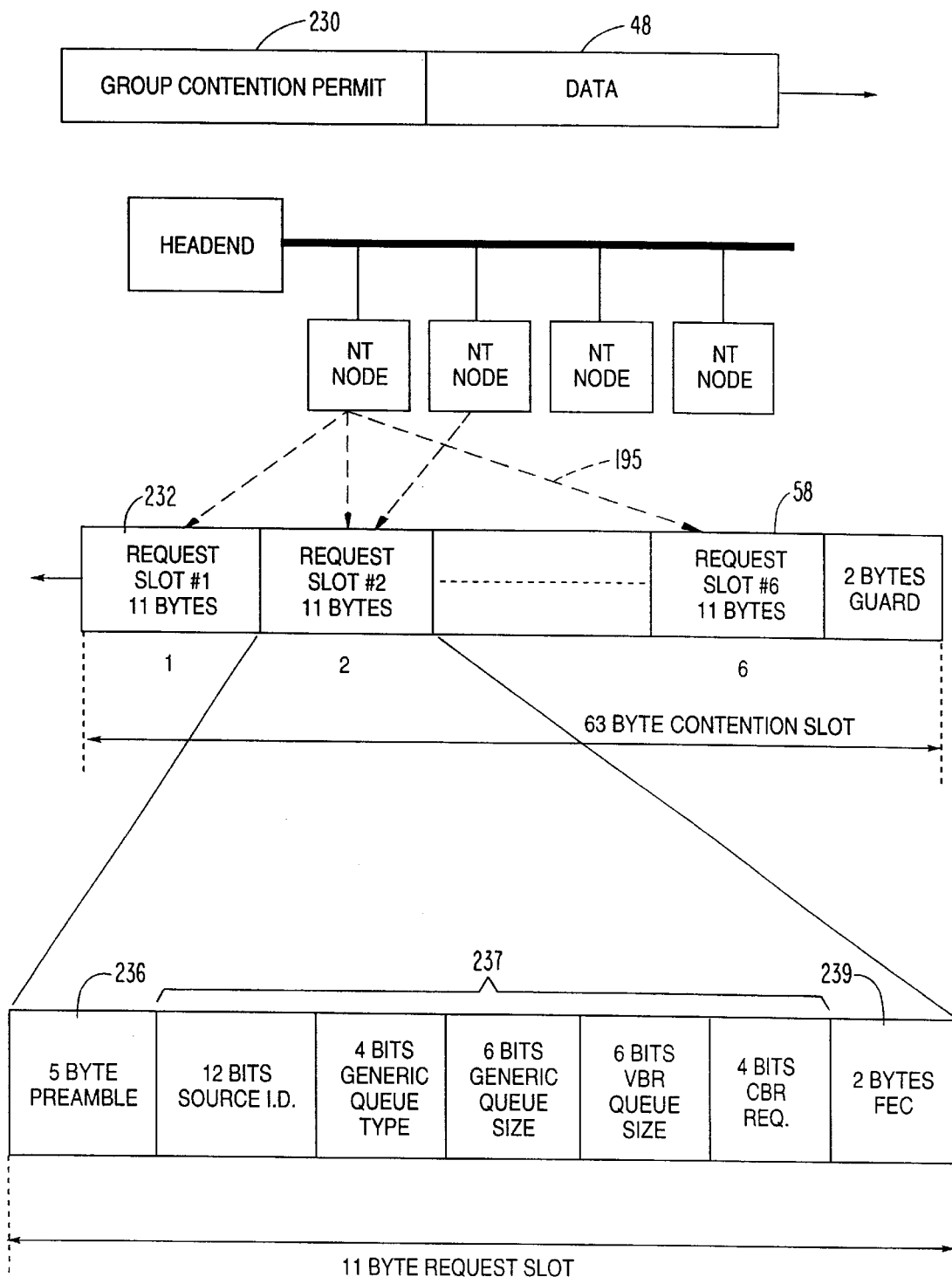

Referring to FIG. 15, to accommodate a greater number of upstream communication requests without having to poll each NT 26, the HEMAC 28 may also periodically transmit a "group contention permit" 230, which allows any NT of a specified group to send an upstream request contained in a respective eleven byte, "mini contention request" slot 232. In a presently preferred embodiment, each NT 26 of the specified group is allowed to contend for any one of up to six respective mini slot positions of a responsive upstream frame 58, as indicated by the dashed line 195, although it may only contend for a single mini slot position, per group contention permit 230. The eleven byte contention request slot 232 is identical to the afore-described eleven byte contention mode request slot 217, including a twelve bit source ID field. As with the afore-described reservation mode polling requests 222, however, no upstream data is transmitted.

In a presently preferred embodiment, the collision feedback data field 80 is used by the HEMAC 28 to provide feedback information to the respective NTs 26 regarding the success or failure of an attempted response to a group contention permit 230 in substantially the same manner as with the contention request and signon response slots 212 and 182, respectively, as described above in conjunction with FIGS. 9 and 13. However, because there are actually six mini slots being contended for by the responding NTs 26, each of the six, two-bit collision indicator fields 89 (i.e., CI1–CI6, respectively (seen in FIG. 5) are used. In particular, if there is a collision detected in any of the six mini slots, the HEMAC 28 will set the collision feedback field for the respective channel and populate each of the respective collision indicator fields 89, as follows: if the respective mini slot was empty (i.e., "no carrier") the field is set to "00"; if a mini contention request slot 232 is successfully received in a respective mini slot, the field is set to "01"; and if there is a collision in a respective mini slot, the respective field is set to "11", indicating that no request 232 was received in that particular mini slot and that retransmission is required, e.g., in accordance with the afore-described RAA algorithms. Again, in situations where multiple upstream frequency channels are employed by the network 20, a four bit "channel number" is provided in field 91 by the HEMAC 28 to identify which upstream channel the information in the collision feedback field 80 applies to.

Block request permits 220 or group contention permits 230 are preferably issued by the HEMAC 28 on a regularly scheduled basis to better ensure upstream transmission access to all NTs.

Figure 16A:
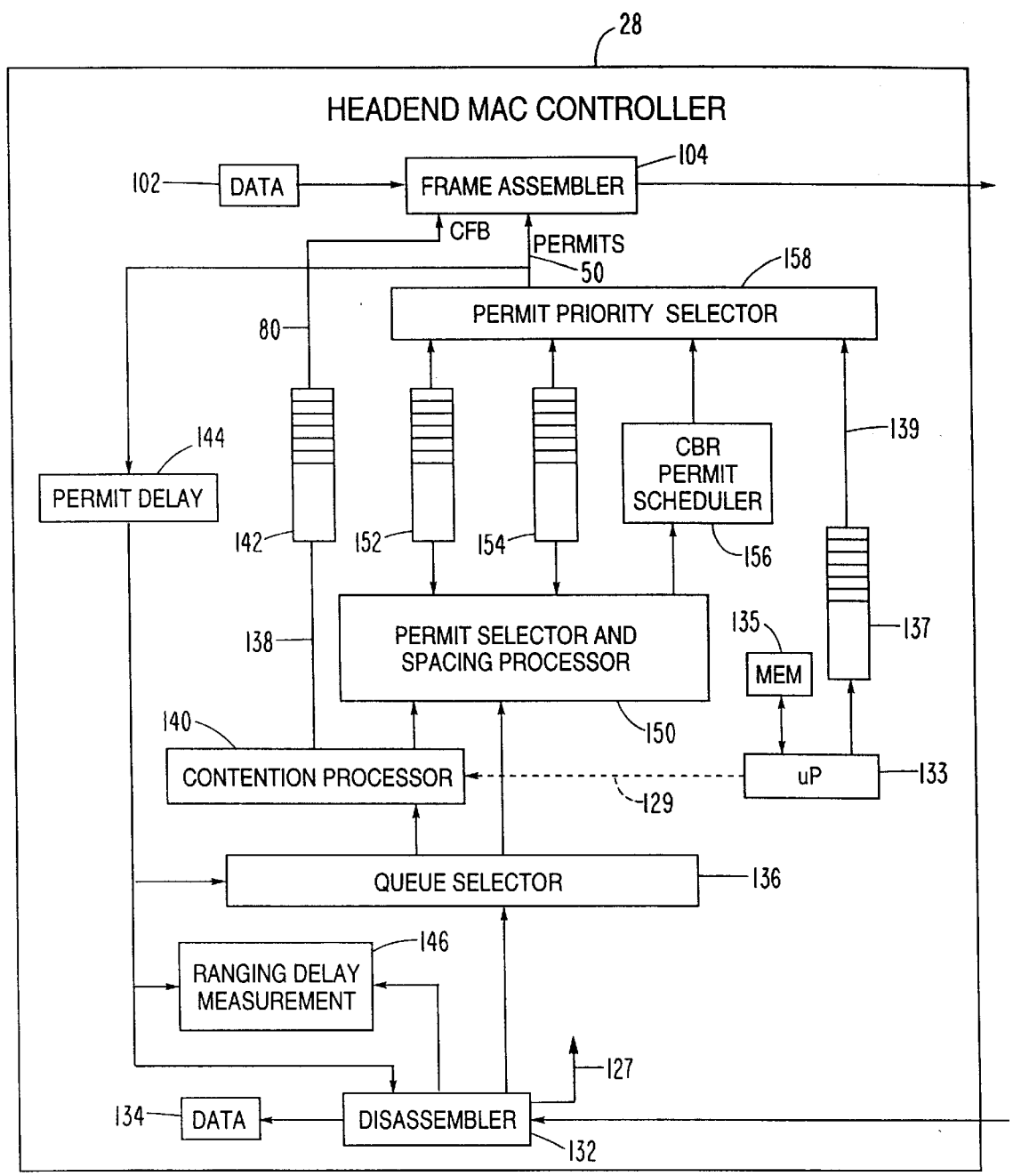
Figure 16B:
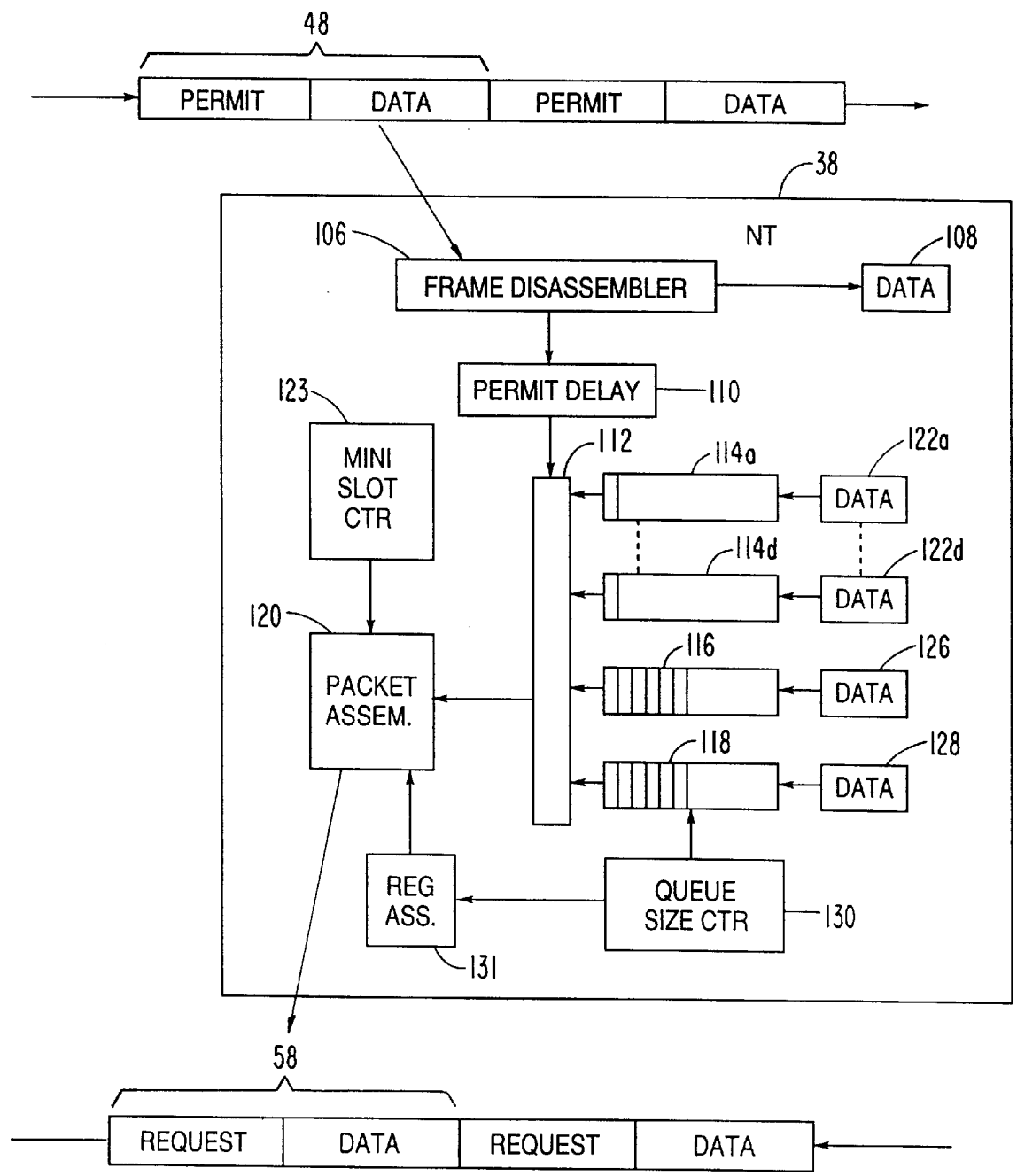

Referring to FIG. 16, the HEMAC 28 receives one or more downstream digital data streams 102 from various data service interfaces such as, e.g., POTS telephony interface 30, ATM interface 32 and LAN interface 34, respectively, (shown in FIG. 1) for transmission to the respective NTs 26. The respective data streams 102 are fed into a frame assembler 104, which, in accordance with the afore-described framing protocol described in conjunction with FIGS. 3–8, assembles the received data into respective downstream data frames 48 for transmission over the coaxial distribution network 24. The assembler 104 also receives periodic contention feedback data, referred to generally in FIG. 16 as the contention feedback data field "80" described above in the text accompanying FIG. 5, and successive upstream bandwidth permits, referred to generally in FIG. 16 as the permits 50 described above in the text accompanying FIG. 2, for inclusion in the MAC control information (e.g., subframe 76 in FIG. 5) of the respective downstream data frames 48.

As each downstream data frame 48 is received by a respective NT 26, the frame 48 is input into a dissembler 106 located in the NT MAC 38. If it is an intended recipient of the data contained therein, the disassembler 106 strips off the framing overhead and parses the downstream data 108 into respective data streams for further processing (not shown) by the NT MAC 38. The frame disassembler 106 also recovers the respective permit 50 in the MAC control overhead of the downstream frame 48—i.e., pertaining to the upstream frequency channel assigned to that NT 26. The NT MAC 38 then evaluates the respective permit 50 by reading the respective permit type and ID fields and, if a response is either required or desired, the recovered permit 50 is input into a ranging delay circuit 110. In a manner described above in conjunction with FIGS. 10–11, the ranging delay circuit 110 delays the permit within the NT MAC 38 for a preset period of time, such that the responsive upstream transmission of a response slot is serially coordinated with the upstream frame interval timing. Following the delay period, the permit 50 is input into an upstream transmission controller 112. Upon receipt of the permit, the controller 112 immediately triggers the upstream transmission of a responsive upstream data frame 58 by a packet assembler 120, depending upon the type of upstream response called for by the respective permit (50).

More particularly, within the NT MAC 38 are a plurality of ATM cell queues, including CBR queues 114a–d, VBR queue 116 and UBR queue 118, respectively, wherein respective upstream data streams are serially assembled into successive ATM cells 62 in the respective queues. In the illustrated preferred embodiment of FIG. 16, CBR queues 114a–d assemble respective ATM cells 62 containing CBR service data representing synchronous telephony PCM data from corresponding telephony channels 122a–d. VBR queue 116 assembles and, depending on network traffic conditions, stores ATM cells (62) containing digital VBR service data. Likewise, UBR queue 118 assembles and, as necessary, stores ATM cells (62) containing digital UBR service data. As will be apparent to those skilled in the art, any number of service type ATM cell queues may be used by the NT MAC 38 in accordance with the transmission protocol methodology provided herein, limited only by the available upstream bandwidth of the particular upstream channel assigned to the respective NT 26.

Respective upstream request slots are populated as follows:

When responding to all reservation or contention mode permits other than signon or ranging permits, queue size counters 130 monitor the respective VBR and UBR service queues 116 and 118, tracking the number of pending ATM cells awaiting upstream transport in each respective service type queue. The counters provide an updated cell count to a request slot assembler 131 for each respective service type queue. the request slot assembler 131 uses this information to populate respective "queue size" fields in the next outgoing request slot. In the illustrated preferred embodiment of FIG. 16, the "generic queue" fields (e.g., fields 203/205 and 213/215 of FIGS. 12 and 13) in the respective upstream request slots (i.e., slots 202, 212, 222 and 232 of FIGS. 12–15) are used to transmit the queue size of the UBR queue 118, with the "generic type" field containing a code indicating "UBR" service. In alternate preferred embodiments, the respective "generic queue" fields of the upstream requests may be alternately used by the NT MAC 38 to send information to the HEMAC 28 regarding any number of different service type queues, either on a dedicated or alternating basis, depending upon available upstream bandwidth and service type priority.

Because of its relatively high service level priority, VBR services are preferably given a dedicated queue field in the upstream requests.

A CBR service monitor (not shown) monitors telephony channels 122a–d for activity—e.g., such as an initial off-hook detection—and reports the status of each telephony channel to the request slot assembler 131. This information is used to populate the "CBR request" field (e.g., fields 204 and 214 of FIGS. 12 and 13) of the upstream requests. For example, in a presently preferred embodiment, each of the four bits of the CBR request fields is assigned to a corresponding telephony channel 112a–d. In each upstream request slot, the request slot assembler 131 sets the respective bit of the CBR request field to "1" if the corresponding telephony channel is active and otherwise sets each bit to "0". In alternate preferred embodiments, the generic queue fields may be used to send status information regarding further CBR telephony channels. As explained in greater detail below, CBR traffic requires very low CDV. As such, CBR queues 114a–d preferably store no more information than the data of a cell currently being assembled.

For all upstream requests, including signon and ranging permits (i.e., permits 180 and 190 of FIGS. 9 and 10), the respective NT ID information for the request slots is preferably supplied directly by the packet assembler 120. A "mini slot" timing counter 123 is employed to add a further calculated delay to upstream frame transmission in cases where a mini request slot is being transmitted in response to a group contention or polling permit (i.e., permits 220 and 230 of FIGS. 14 and 15). As with the ranging delay circuitry 110, the delay value of circuit 123 is supplied by the HEMAC 28 by way of OAM provisioning data.

The respective upstream data frames 58 are received by the HEMAC 28 and input into a frame disassembler 132, which strips the respective request slot(s) from any data 134 and/or OAM information (not shown) contained in an appended ATM cell. In accordance with a more particular aspect of the '088 application, a copy of each permit 50 input into the downstream frame assembler 104 is delayed by respective HEMAC delay circuitry 144, and input into the frame disassembler 132, respectively. The HEMAC delay circuitry 144 delays the each successive permit 50 to match to overall round-trip transmission timing of network 20—i.e., such that each respective permit 50 will arrive at the frame disassembler 132 at the same time as the responsive upstream request slot.

Depending on the respective permit type and responsive request slot, the frame disassembler 132 will extract the pertinent data contained in each received request slot and pass it into a first queue selector 136, for further processing by the HEMAC 28. In cases where a reservation mode permit was issued—i.e., either a ranging permit 90, regular reservation permit 100, or a group polling permit 120, respectively—the disassembler 132 must first append the respective network terminal ID information from the permit 50 to the received request slot. In this manner, all requests received by the queue selector 136 (excepting signon and ranging slots 182 and 192) will contain the same data fields, regardless of whether the slot was originally in response to a contention or reservation mode permit.

For received signon slots 182, the disassembler 132 transmits the four byte NT ID field directly to an internal HEMAC processor 133. If a four byte ID was successfully received, the processor 133 stores the information in an associated memory 135 and issues an ensuing ranging permit. The processor 133 also issues a feedback message 129 regarding the success (or lack there of) of the response for placement in the pertinent collision feedback data field of an ensuing downstream data frame 48, via a contention processor 140 (described below).

Where a ranging response slot 192 is received, the disassembler stops a ranging delay measurement clock 146, which was activated by the respective permit 50. The overall transmission time is then relayed from the clock 146 to the processor 133 for further handling as described above.

For all other received request slots, the HEMAC performs the following processing steps:

With respect to contention requests, (i.e., contention requests 217 and 227 in FIGS. 13 and 15, respectively), the queue selector 136 attaches the downstream frame transmission slot number of the respective permit (i.e., as described above in conjunction FIGS. 5 and 9) to the responsive request data and then transmits the respective requests into a contention request processor 140. The contention request processor 140 reads the respective data fields in each request to determine if (1) a response was successfully received, (2) a collision occurred, or (3) no response was received at all (i.e., no carrier), and generates feedback data 138 for a corresponding collision information field (80). If a contention request was successfully received, the contention processor 140 inputs the request into a permit selector and spacing processor 150. In all cases, the generated feedback data is forwarded to a collision feedback data queue 142 for placement by the downstream frame assembler 104 into the respective MAC overhead field corresponding to the upstream frequency channel, e.g., data field 80, of an ensuing downstream data frame 48.

Non-contention requests (i.e., requests 207 and 227 in FIGS. 12 and 14, respectively) are fed directly from the queue selector 136 into the permit selector and spacing processor 150.

Referring to FIG. 17, all requests input into the permit selector and spacing processor 150 are first processed by a selector circuit 151, which separates the requests based on service type and NT ID. In particular, VBR queue information 167 is parsed into a VBR bandwidth manager 153, wherein the VBR queue size for of each NT 26 is placed into a respective "leaky bucket register" ("LBR") 157. Likewise, UBR queue information 167 is parsed into a UBR bandwidth manager 155, wherein the UBR queue size for each NT 26 is also placed into a respective LBR 161. CBR request data 169 is parsed directly into a CBR permit scheduler 156.

Within the respective bandwidth managers 153 and 155, permits of the same service priority for different NTs 26 are issued on a "round robin" basis by selectors 159 and 163, respectively. In particular, round robin selector 159 in the VBR bandwidth mgr 153 successively issues a "VBR" type permit into a VBR permit queue 152 for each successive NT LBR 157 having at least one VBR cell in queue. Likewise, round robin selector 163 in the UBR bandwidth mgr 155 successively issues a "UBR" type permit into a UBR permit queue 154 for each successive NT LBR 161 having at least one UBR cell in queue. In this manner, each NT having at least one cell in queue of a respective VBR or UBR service type is given an equal allocation of the available upstream bandwidth for that respective service level, even though other NTs may have a much larger queue size.

Instead, the LBR registers 157 and 161 act as a "gate" for the incoming request information. Whenever a request arrives from a respective NT 26, the associated LBR 157 and 161 are incremented by the number of new cells in each respective service queue. The respective LBRs 157 and 161 are also decremented at a selected mean rate allocated to that particular NT. The individual LBRs 157 and 161 are each defined by a top threshold, or "burst size." So long as the respective LBR queue register is below this threshold, all incoming requests are allowed to into the respective outgoing permit queue 152 or 154. If the threshold is exceeded, however, no further permits are issued until the respective LBR "leaks" below the threshold.

Referring again to FIG. 16, a permit priority selector 158 feeds the respective permits from the VBR and UBR queues 152 and 154, and from the CBR permit scheduler 156, respectively, to the downstream frame assembler 104. Occasional signon and ranging permits (i.e., 180 and 190) issued directly from processor 133 into a separate queue 137 are also input into the downstream assembler 104 frames by priority selector 158.

In accordance with another general aspect of the '088 application, CBR permits from the CBR scheduler 156 are generally given top priority by the priority selector 158, due to the very low CDV that must be maintained for these service. VBR and UBR permits from queues 152 and 154 each take a respective lower priority, with signon and ranging permits from queue 137 typically given the lowest priority.

The scheduling of CBR permits by the CBR scheduler 156 is preferably carried out so that telephony data is received at the headend 22 at intervals averaging 5.875 msec, in accordance with synchronous telephony standards. In particular, CE telephony "AAL1" standards require the "packing" of forty-seven bytes of PCM data from a telephone channel (e.g., from a single DS0 channel such as telephony channels 122a–d received at the NT MAC 28 illustrated in FIG. 16) into each CBR ATM cell. As described in the '088 application, because the data arrives at the NT 26 on a one-byte-per 125 usec basis, a 5.875 msec delay with respect to the first arriving byte is already required to fully pack each cell. When employing the preferred frame interval timing of 250 usec to transmit the frames upstream to the HEMAC 28, 5.875 msec will not fall on an even time interval—, i.e., on either 5.75 msec based on every twenty-three frame intervals, or 6.00 msec based on every twenty-four frame intervals, respectively.

Thus, in order to match the AAL1 frame timing standards, the CBR permit scheduler 156 evenly allocates the CDR telephony permits based on a repetitive rotation of forty-seven downstream frames for each respective telephony channel. More particularly, referring to FIG. 18, to match the AAL1 47 byte fill rate of 5.875 msec, the CBR permit scheduler 158 employs a scheduling table 160 for issuing CBR permits to respective active telephony channels in the respective NTs 26. The scheduling table 160 employs a looped counter of forty-seven permit timing interval slots 162, wherein each slot is associated with a respective 250 usec downstream frame interval.

For each available timing interval slot 162, a network terminal ID 164 and Call ID channel 166 may be assigned by the CBR permit scheduler 156, based on availability at the time the first "active" flag is set to a "1" in the Call ID field of an incoming request slot from a respective NT 26. The slot assignment is relayed to the respective NT 26 in an ensuing downstream data frame 48, i.e., by OAM provisioning data. In a manner described below in conjunction with FIGS. 19 and 20, the respective NT 26 thereafter assembles its respective ATM cells on a "just-in-time" basis, so that each respective CBR ATM cell is fully packed and ready for upstream transmission just as the respective permit arrives from the HEMAC 28.

By way of example, operation of the scheduling table 160 when two active NT Call ID channels are active is shown in FIG. 18. At interval 0002, a CBR permit is allocated for NT #0520, Call ID #1, and at interval 0025, i.e., after 5.75 msec, the next successive permit is issued for NT #0520, Call ID #1. Because the timing interval 162 is looped, the next permit for NT #0520, Call ID #1 will occur again at slot 0002 of the ensuing loop, i.e., after 6.0 msec. By repeating this loop, the CBR telephony permits for NT #0520, Call ID #1 are thus issued at an average interval of 5.875 msec, with a maximum CDV of ±125 usec, which is well within acceptable CDV standards for CBR telephony service. Likewise, at intervals 0023 and 0047, CBR permits are allocated for NT #0003, Call ID #2. Again, because the timing interval 162 is looped, the permits for NT #0003, Call ID #2 are allocated every 5.75 usec and 6.0 usec, respectively, for an average interval of 5.875 msec and a maximum CDV of ±125 usec.

In accordance with a general aspect of the invention, the arrival of the scheduled CBR permits is synchronized with the assembly and packing of each new CBR ATM cell.

Figure 19:
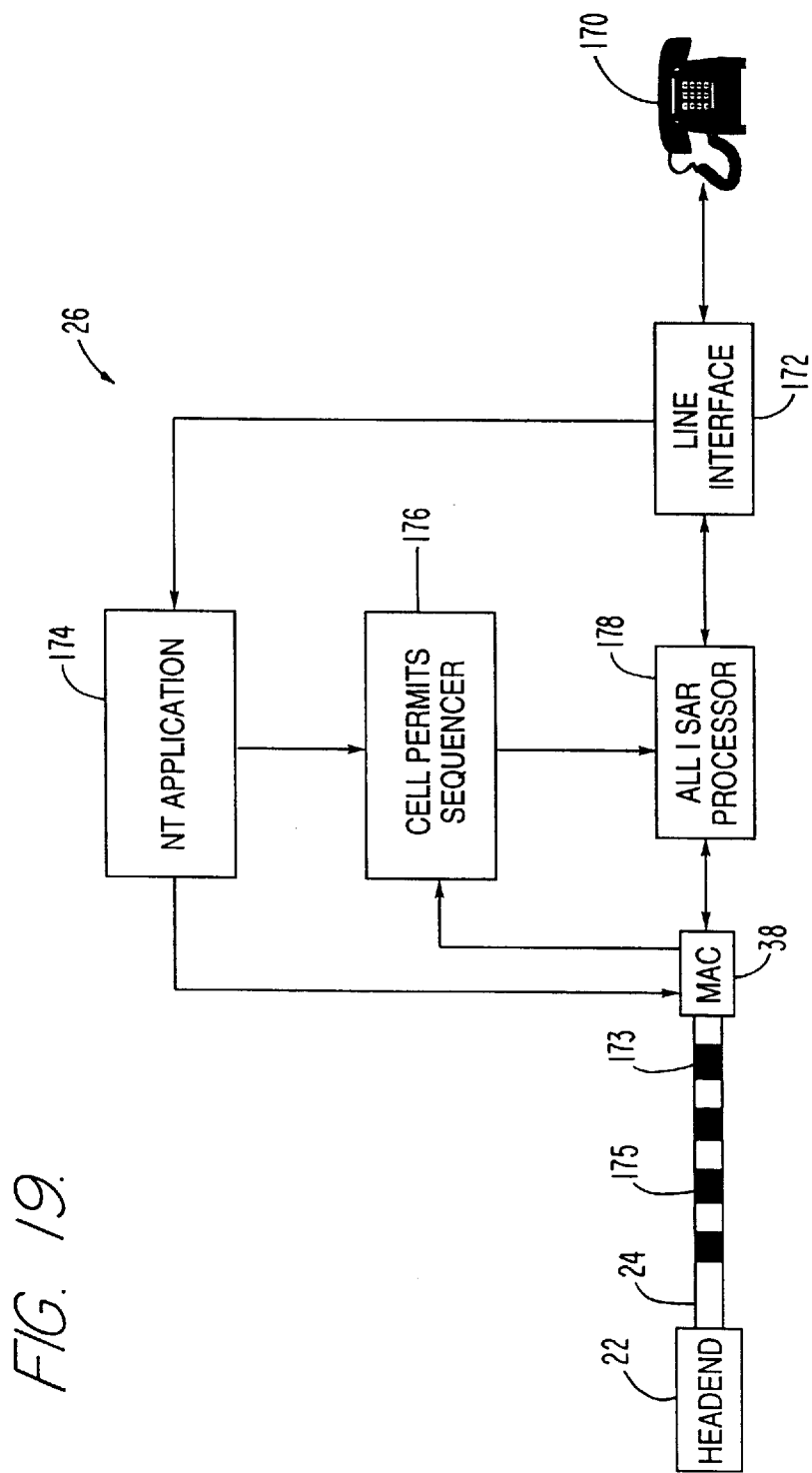
FIG. 19 is a functional block diagram of the process at a preferred NT for requesting and synchronizing CBR permits.

In particular, referring to FIG. 19 in conjunction with the previous figures, a subscriber line 170 is connected to a a line interface module 172 within a respective NT 26, whereby the subscriber line 170 is constantly 26 monitored by an NT application (software) layer 174. Upon detecting an off-hook condition on the subscriber line 170, the NT application layer 174 signals the NT MAC 38, which sends a request containing the pertinent subscriber line ID (i.e., of subscriber line 170) to the CBR permit scheduler 156 in the HEMAC 28. Assuming there is sufficient capacity, the CBR permit scheduler 156 assigns the subscriber line 170 to an available timing interval slot 162, and notifies the respective NT 26 (e.g., in an ensuing OAM transmission) that the CBR permits for line 170 have been scheduled.

Upon detection of the off-hook condition, the NT application layer 174 also notifies a cell permit sequencer 176, which enters into a "ready" state in anticipation of a first CBR permit associated with line 170. Upon receipt of the first scheduled CBR permit 173, the NT MAC 38 signals the cell permits sequencer 176, which triggers an internal timer (not shown) in response. In particular, the timer is set for an interval equal to the anticipated arrival time of a "permit-after-next" 175, which will arrive 11.75 msec after the first permit 173, minus the sum of the time required to collect forty-seven data bytes for the first CBR ATM cell (i.e., at a 8 KHz sample rate of 125 usec per sample, for a total of 5.875 msec) and a predetermined internal NT transmission and processing overhead time of, in a presently preferred embodiment, approximately 0.20 usec.

When the timer expires, i.e., after 11.75−(5.875+0.20)= 5.65 msec, the cell permits sequencer 176 immediately activates an AAL1 segmentation and reassembly ("SAR") processor 178, which immediately begins assembly of a first CBR ATM cell by packing conseqütive data sample bytes received from the line interface module 172. In particular, the line interface module 172 digitally samples an analog (voice) signal from the subscriber line 170 every 125 usec, with the samples packed into successive ATM cells by the AAL1 SAR processor 178.

Prior to receipt of the activation signal from the cell permits sequencer 176, the SAR processor 178 drops the received samples from the line interface module 172. Once the initial ATM cell is fully constructed, it is transmitted from the SAR processor 178 to a respective CBR queue (e.g., queues 122a–d in FIG. 16) in the NT MAC 38.

As will also be appreciated from the present disclosure, the timer in the cell permits sequencer 176 will cause the first CBR ATM cell of the newly activated call activation sequence to be packed and in position for upstream transmission (i.e., in queue 122), just as the third permit 175 in the scheduled sequence arrives at the NT 26. As such, the ensuing CBR ATM cells will thereby be synchronized with the MAC layer permits, and delay time at the NT 26 thus minimized.

While embodiments and applications of this invention have been shown and described, as would be apparent to those skilled in the art, many more modifications and applications are possible without departing from the inventive concepts herein.

For example, while in the above-disclosed preferred embodiments the permit delay circuitry 110 already takes into account the delay due to the transmission distance of the respective NT 26, in alternate preferred embodiments, this delay value may instead be built directly into the cell permits sequencer 176 (i.e., for all permits and not just CBR permits).

The scope of the disclosed inventions, therefore, are not to be restricted except in the spirit of the appended claims.

What is claimed:

1. In a communication network comprising a headend and a plurality of network terminals in communication with the headend over a shared communication medium, a method for synchronizing the delivery of data cells from a network terminal to the headend with the delivery of upstream transmission permits from the headend to the network terminal, comprising the steps of:

initiating the transmission of a series of successive upstream transmission permits from the headend to the network terminal, wherein the permits are delivered according to a predetermined schedule;

initiating a timer for a preset duration, upon receipt of a first permit in the series; and activating a cell assembly process at the network terminal upon the expiration of the timer, wherein the timer duration is set such that a first data cell is assembled and ready for upstream transmission upon receipt of an ensuing permit in the series.

2. The method of claim 1, wherein the ensuing permit is the third permit in the series.

3. The method of claim 1, wherein the step of initiating the transmission of a series of successive upstream transmission bandwidth permits from the headend to the network terminal comprises the steps of:

monitoring a subscriber access line associated with the network terminal for an off-hook condition; and transmitting an upstream bandwidth request to the headend if an off-hook condition is detected.

4. The method of claim 3, wherein the upstream bandwidth request is for continuous bit rate service for the respective subscriber line.

5. In a communication network comprising a headend and a plurality of network terminals, a method for synchronizing the delivery of ATM cells from a network terminal to the headend with the delivery of respective upstream transmission permits from the headend to the network terminal, comprising the steps of:

monitoring a subscriber access line associated with the network terminal for an off-hook condition;

initiating the transmission of a series of successive upstream transmission permits from the headend to the network terminal if an off-hook condition is detected, wherein the permits are delivered according to a predetermined schedule;

initiating a timer for a preset duration, upon receipt of a first permit in the series; and activating a cell assembly process at the network terminal upon the expiration of the timer, wherein the timer duration is set such that a first ATM cell is assembled and ready for upstream transmission upon receipt of an ensuing permit in the series.

6. The method of claim 5, wherein the ensuing permit is the third permit in the series.

* * * * *